US011468408B2

(12) United States Patent
Ma et al.

(10) Patent No.: US 11,468,408 B2
(45) Date of Patent: Oct. 11, 2022

(54) BUILDING AUTOMATION SYSTEM WITH VISITOR MANAGEMENT

(71) Applicant: Johnson Controls Tyco IP Holdings LLP, Milwaukee, WI (US)

(72) Inventors: Ada L. Ma, Kenmore, WA (US); Sudhi R. Sinha, Milwaukee, WI (US); Erik S. Paulson, Madison, WI (US); Elyse R. Hobson, Milwaukee, WI (US); Youngchoon Park, Brookfield, WI (US); Justin J. Ploegert, Cudahy, WI (US); Sandeep K. Sen, Milwaukee, WI (US)

(73) Assignee: JOHNSON CONTROLS TYCO IP HOLDINGS LLP, Milwaukee, WI (US)

(*) Notice: Subject to any disclaimer, the term of this patent is extended or adjusted under 35 U.S.C. 154(b) by 69 days.

(21) Appl. No.: 16/746,529

(22) Filed: Jan. 17, 2020

(65) Prior Publication Data

US 2020/0233389 A1    Jul. 23, 2020

Related U.S. Application Data

(60) Provisional application No. 62/794,357, filed on Jan. 18, 2019, provisional application No. 62/794,276, (Continued)

(51) Int. Cl.
*G06Q 10/02* (2012.01)
*G06Q 10/10* (2012.01)
(Continued)

(52) U.S. Cl.
CPC ....... *G06Q 10/1095* (2013.01); *G05B 19/042* (2013.01); *G05B 23/0218* (2013.01);
(Continued)

(58) Field of Classification Search
CPC .................. G05B 15/02; G05B 19/042; G05B 2219/25011; G05B 23/0218;
(Continued)

(56) References Cited

U.S. PATENT DOCUMENTS 7,552,467 B2    6/2009    Lindsay
8,180,663 B2    5/2012    Tischhauser et al.
(Continued)

FOREIGN PATENT DOCUMENTS

AU    2019226217 A1    11/2020
AU    2019226264 A1    11/2020
(Continued)

OTHER PUBLICATIONS

Hipla, "Visitor Management: Smart Solutions to visitors, saving time and maximizing productivity," URL: https://hipla.io/visitor-management.html, retrieved from internet Mar. 3, 2021, 3 pages.
(Continued)

*Primary Examiner* — Dionne Pendleton
(74) *Attorney, Agent, or Firm* — Foley & Lardner LLP

(57) ABSTRACT

One or more non-transitory computer-readable storage media having instructions stored thereon that, when executed by one or more processors, cause the one or more processors to receive a request to hold a meeting in a building, the request including an individual, retrieve, from the request, contact information for the individual, transmit a request for identifying information to the individual using the contact information, determine a purpose of the individual based on the identifying information, generate a virtual ticket for the individual based on the purpose of the individual, identify a presence of the individual at the building based on the identifying information and image data, and control access control devices in response to
(Continued)

US 11,468,408 B2

Page 2 identifying the presence of the individual to grant the individual access to the building.

20 Claims, 8 Drawing Sheets

Related U.S. Application Data filed on Jan. 18, 2019, provisional application No. 62/794,407, filed on Jan. 18, 2019, provisional application No. 62/794,533, filed on Jan. 18, 2019, provisional application No. 62/794,032, filed on Jan. 18, 2019, provisional application No. 62/794,389, filed on Jan. 18, 2019, provisional application No. 62/794,370, filed on Jan. 18, 2019, provisional application No. 62/794,415, filed on Jan. 18, 2019, provisional application No. 62/794,535, filed on Jan. 18, 2019, provisional application No. 62/794,393, filed on Jan. 18, 2019, provisional application No. 62/794,489, filed on Jan. 18, 2019, provisional application No. 62/794,348, filed on Jan. 18, 2019, provisional application No. 62/794,502, filed on Jan. 18, 2019.

(51) Int. Cl.

| | |
|---|---|
| *G06Q 30/06* | (2012.01) |
| *G06F 9/451* | (2018.01) |
| *G06F 16/28* | (2019.01) |
| *G06F 16/248* | (2019.01) |
| *G06F 16/25* | (2019.01) |
| *H04L 9/32* | (2006.01) |
| *G07C 9/37* | (2020.01) |
| *G07C 9/00* | (2020.01) |
| *G05B 19/042* | (2006.01) |
| *G05B 23/02* | (2006.01) |
| *G06Q 10/08* | (2012.01) |
| *G06F 16/901* | (2019.01) |
| *G06Q 10/06* | (2012.01) |
| *G08G 1/14* | (2006.01) |
| *G07C 9/27* | (2020.01) |
| *G07C 9/21* | (2020.01) |
| *G07C 9/22* | (2020.01) |
| *G07C 9/23* | (2020.01) |
| *G07C 9/25* | (2020.01) |
| *G07C 9/28* | (2020.01) |
| *G06V 20/52* | (2022.01) |
| *G06V 20/58* | (2022.01) |
| *G06V 40/10* | (2022.01) |
| *G06Q 50/26* | (2012.01) |
| *G06V 20/62* | (2022.01) |

(52) U.S. Cl.
CPC ............ *G06F 9/451* (2018.02); *G06F 16/248* (2019.01); *G06F 16/252* (2019.01); *G06F 16/288* (2019.01); *G06F 16/9024* (2019.01); *G06Q 10/06398* (2013.01); *G06Q 10/087* (2013.01); *G06Q 10/10* (2013.01); *G06Q 30/0633* (2013.01); *G06V 20/52* (2022.01); *G06V 20/586* (2022.01); *G06V 40/103* (2022.01); *G07C 9/00563* (2013.01); *G07C 9/21* (2020.01); *G07C 9/22* (2020.01); *G07C 9/23* (2020.01); *G07C 9/253* (2020.01); *G07C 9/27* (2020.01); *G07C 9/28* (2020.01); *G07C 9/37* (2020.01); *G08G 1/142* (2013.01); *G08G 1/148* (2013.01); *G08G 1/149* (2013.01); *H04L 9/3247* (2013.01); *G05B 2219/25011* (2013.01); *G06Q 50/26* (2013.01); *G06V 20/625* (2022.01)

(58) Field of Classification Search
CPC ........ G05B 2219/2614; G05B 13/0265; G05B 13/04; G05B 2219/2642; G05B 19/048; G06F 16/248; G06F 16/252; G06F 16/288; G06F 16/9024; G06F 9/451; G06F 21/6245; G06F 21/6254; G06F 2221/2111; G06F 3/167; G06F 40/186; G06F 40/58; G06K 2209/15; G06K 9/00369; G06K 9/00771; G06K 9/00812; G06Q 10/06398; G06Q 10/087; G06Q 10/10; G06Q 10/1095; G06Q 30/0633; G06Q 50/26; G06Q 10/04; G06Q 10/06; G06Q 10/063; G06Q 50/06; G06Q 50/12; G06Q 10/02; G06Q 10/025; G06Q 10/01095; G06Q 30/02; G06Q 40/025; G06Q 50/10; G07C 9/00563; G07C 9/21; G07C 9/215; G07C 9/22; G07C 9/23; G07C 9/253; G07C 9/27; G07C 9/28; G07C 9/37; G07C 9/20; G07C 9/25; G07C 9/10; G07C 9/00; G08G 1/142; G08G 1/148; G08G 1/149; H04L 9/3247; H04L 12/2809; H04L 12/2827; H04L 12/2812; H04L 12/2832; H04L 41/0886; H04L 67/125; H04L 12/8216; H04L 67/12; H04L 12/2803; H04L 12/281; H04L 12/2818; H04L 12/282; H04L 12/2821; H04L 12/66; H04L 63/0807; H04L 65/40; H04L 67/10; H04L 67/306; H04L 67/60; Y04S 10/50; F24F 11/62; F24F 2110/10; F24F 2130/10; F24F 11/30; F24F 11/52; F24F 11/58; F24F 11/61; F24F 11/65; F24F 2110/12; F24F 2130/00; F24F 2140/60; F24F 11/47; F24F 11/48; F24F 11/88; F24F 2120/10; F24F 2120/20; F24F 2130/20; G05D 23/1923; G05D 23/1934; H05B 47/19; G06N 20/00; G06V 40/172; G10L 15/183; G10L 15/26; H04W 12/06; H04W 4/33

See application file for complete search history.

(56) References Cited

U.S. PATENT DOCUMENTS

| | | |
|---|---|---|
| 8,346,589 B1 | 1/2013 | Norton et al. |
| 8,629,755 B2 | 1/2014 | Hashim-Waris |
| 8,907,803 B2 | 12/2014 | Martin |
| 9,202,322 B2 | 12/2015 | Kappeler et al. |
| 9,576,255 B2 | 2/2017 | Kalb et al. |
| 9,666,075 B2 | 5/2017 | Davies et al. |
| 9,811,249 B2 | 11/2017 | Chen et al. |
| 9,955,318 B1 | 4/2018 | Scheper et al. |
| 10,154,138 B2 | 12/2018 | Te Booij et al. |
| 10,171,297 B2 | 1/2019 | Stewart et al. |
| 10,354,531 B1 | 7/2019 | Bronder et al. |
| 10,380,854 B1 | 8/2019 | Yu |
| 10,505,756 B2 | 12/2019 | Park et al. |
| 10,564,993 B2 | 2/2020 | Deutsch et al. |
| 10,760,815 B2 | 9/2020 | Janakiraman et al. |
| 10,762,475 B2 | 9/2020 | Song et al. |
| 10,824,120 B2 | 11/2020 | Ahmed |
| 10,845,771 B2 | 11/2020 | Harvey |
| 10,921,760 B2 | 2/2021 | Harvey |
| 10,969,133 B2 | 4/2021 | Harvey |
| 11,041,650 B2 | 6/2021 | Li et al. |
| 11,054,796 B2 | 7/2021 | Holaso |

(56) References Cited

U.S. PATENT DOCUMENTS

| | | |
|---|---|---|
| 2002/0169514 A1 | 11/2002 | Eryurek et al. |
| 2002/0188557 A1* | 12/2002 | Ochiai ................ G06Q 40/025 705/38 |
| 2003/0150908 A1 | 8/2003 | Pokorny et al. |
| 2003/0158795 A1 | 8/2003 | Markham et al. |
| 2004/0252288 A1 | 12/2004 | Kacyra et al. |
| 2006/0015376 A1 | 1/2006 | Sattler et al. |
| 2006/0227010 A1 | 10/2006 | Berstis et al. |
| 2007/0250417 A1 | 10/2007 | Lane et al. |
| 2007/0250920 A1 | 10/2007 | Lindsay |
| 2008/0162198 A1 | 7/2008 | Jabbour et al. |
| 2008/0263467 A1 | 10/2008 | Wilkins |
| 2008/0266383 A1 | 10/2008 | Shah et al. |
| 2009/0070407 A1 | 3/2009 | Castle et al. |
| 2010/0128931 A1 | 5/2010 | Bongard |
| 2011/0054968 A1 | 3/2011 | Galaviz |
| 2011/0184943 A1 | 7/2011 | Norton et al. |
| 2012/0022698 A1 | 1/2012 | Mackay |
| 2012/0112929 A1 | 5/2012 | Gupta et al. |
| 2012/0143356 A1 | 6/2012 | Berg-Sonne et al. |
| 2012/0310852 A1 | 12/2012 | Ramalingamoorthy et al. |
| 2012/0323643 A1 | 12/2012 | Volz |
| 2012/0326893 A1 | 12/2012 | Glezerman |
| 2013/0173062 A1 | 7/2013 | Koenig-Richardson |
| 2013/0226320 A1 | 8/2013 | Berg-Sonne et al. |
| 2013/0338970 A1 | 12/2013 | Reghetti |
| 2014/0139359 A1 | 5/2014 | Paul et al. |
| 2014/0334684 A1 | 11/2014 | Strimling |
| 2014/0358285 A1 | 12/2014 | Aggarwal et al. |
| 2015/0066716 A1 | 3/2015 | Shortridge |
| 2015/0138001 A1 | 5/2015 | Davies et al. |
| 2015/0156030 A1 | 6/2015 | Fadell et al. |
| 2015/0156031 A1 | 6/2015 | Fadell et al. |
| 2015/0220942 A1 | 8/2015 | Dubberley |
| 2015/0310682 A1 | 10/2015 | Arora et al. |
| 2016/0134432 A1 | 5/2016 | Hund et al. |
| 2016/0171785 A1 | 6/2016 | Banatwala et al. |
| 2016/0247129 A1 | 8/2016 | Song et al. |
| 2016/0260063 A1 | 9/2016 | Harris et al. |
| 2016/0357521 A1 | 12/2016 | Zhang et al. |
| 2017/0092130 A1 | 3/2017 | Bostick et al. |
| 2017/0372271 A1 | 12/2017 | Goldsmith et al. |
| 2018/0005495 A1 | 1/2018 | Hieb |
| 2018/0018508 A1 | 1/2018 | Tusch |
| 2018/0211539 A1 | 7/2018 | Boss et al. |
| 2018/0268238 A1 | 9/2018 | Khan et al. |
| 2018/0275625 A1 | 9/2018 | Park et al. |
| 2018/0308475 A1 | 10/2018 | Locke et al. |
| 2018/0356775 A1 | 12/2018 | Harvey |
| 2018/0359111 A1 | 12/2018 | Harvey |
| 2019/0017719 A1 | 1/2019 | Sinha et al. |
| 2019/0065014 A1 | 2/2019 | Richter et al. |
| 2019/0088059 A1* | 3/2019 | Santhosh ............... H04L 67/125 |
| 2019/0089808 A1* | 3/2019 | Santhosh ............... H04L 67/32 |
| 2019/0096147 A1 | 3/2019 | Park et al. |
| 2019/0108492 A1* | 4/2019 | Nelson ............... G06K 9/00288 |
| 2019/0121801 A1 | 4/2019 | Jethwa et al. |
| 2019/0122050 A1 | 4/2019 | Beals et al. |
| 2019/0130365 A1 | 5/2019 | Pell et al. |
| 2019/0138333 A1 | 5/2019 | Deutsch et al. |
| 2019/0158309 A1 | 5/2019 | Park et al. |
| 2019/0172165 A1 | 6/2019 | Verteletskyi et al. |
| 2019/0342112 A1* | 11/2019 | Li ............... H04L 12/66 |
| 2019/0361852 A1 | 11/2019 | Rogynskyy et al. |
| 2019/0377306 A1 | 12/2019 | Harvey |
| 2020/0035101 A1 | 1/2020 | Brooks et al. |
| 2020/0116505 A1 | 4/2020 | Lei et al. |
| 2020/0210906 A1* | 7/2020 | Rice ............... G06N 20/00 |
| 2020/0234523 A1 | 7/2020 | Ma et al. |
| 2020/0336328 A1 | 10/2020 | Harvey |
| 2020/0348632 A1 | 11/2020 | Harvey |
| 2020/0387576 A1 | 12/2020 | Brett et al. |
| 2020/0396208 A1 | 12/2020 | Brett et al. |
| 2021/0043221 A1 | 2/2021 | Yelchuru et al. |
| 2021/0325070 A1 | 10/2021 | Endel et al. |
| 2021/0342961 A1 | 11/2021 | Winter et al. |
| 2022/0121965 A1 | 4/2022 | Chatterji et al. |

FOREIGN PATENT DOCUMENTS

| | | |
|---|---|---|
| AU | 2019351573 A1 | 5/2021 |
| CN | 103942308 | 7/2014 |
| CN | 105841293 | 8/2016 |
| EP | 3 268 821 B1 | 1/2018 |
| JP | 2008-310533 A | 12/2008 |
| JP | 2010-277532 A | 12/2010 |
| JP | 2015-060434 A | 3/2015 |
| KR | 2016066115 | 6/2016 |
| WO | WO-2018/132112 A1 | 7/2018 |
| WO | WO-2018/232147 A1 | 12/2018 |
| WO | WO-2020/061621 A1 | 4/2020 |
| WO | WO-2022/042925 A1 | 3/2022 |

OTHER PUBLICATIONS

Siemens, "The office as an active contributor to business success," URL: https://new.siemens.com/bg/en/products/buildings/markets/smart-office.html, retrieved from internet Mar. 4, 2021, 12 pages.

Splan, "Visitor Management: Manage visitor registrations and check-ins in an efficient and secured manner." URL: https://www.splan.com/visitor-management-system.html, 11 pages.

International Search Report and Written Opinion on PCT/US2017/013647, dated Apr. 18, 2017, 10 pages.

Bernard, "What Is Digital Twin Technology—and Why Is It So Important?", Enterprise Tech, Mar. 6, 2017 (5 pages).

\* cited by examiner

BUILDING AUTOMATION SYSTEM WITH VISITOR MANAGEMENT

CROSS-REFERENCE TO RELATED APPLICATION

The present application claims the benefit and priority to U.S. Provisional Patent Application No. 62/794,370, filed on Jan. 18, 2019, U.S. Provisional Patent Application No. 62/794,276, filed on Jan. 18, 2019, U.S. Provisional Patent Application No. 62/794,533, filed on Jan. 18, 2019, U.S. Provisional Patent Application No. 62/794,535, filed on Jan. 18, 2019, U.S. Provisional Patent Application No. 62/794,389, filed on Jan. 18, 2019, U.S. Provisional Patent Application No. 62/794,393, filed on Jan. 18, 2019, U.S. Provisional Patent Application No. 62/794,415, filed on Jan. 18, 2019, U.S. Provisional Patent Application No. 62/794,032, filed on Jan. 18, 2019, U.S. Provisional Patent Application No. 62/794,357, filed on Jan. 18, 2019, U.S. Provisional Patent Application No. 62/794,348, filed on Jan. 18, 2019, U.S. Provisional Patent Application No. 62/794,407, filed on Jan. 18, 2019, U.S. Provisional Patent Application No. 62/794,502, filed on Jan. 18, 2019, U.S. Provisional Patent Application No. 62/794,489, filed on Jan. 18, 2019 the entire disclosures of each of which are incorporated by reference herein.

BACKGROUND

The present disclosure relates generally to a building management system and more particularly to building information management of a building management system that collects, manages, and protects data for interconnected devices and other entities. The present disclosure relates specifically to a building management system with visitor management.

From time to time, various visitors may visit a building to, for instance, conduct or attend meetings with various building employees or personnel. Often times, the visitors are required to arrive early to their meeting for onboarding and passing through security. This may be inefficient, and may also make the visitor feel unwelcome at the building. Thus, it may be advantageous to provide a system that expedites the onboarding/security process while making visitors feel welcome at a building. It may be advantageous to provide a system that seamlessly provides visitors access to various permitted locations within the building.

SUMMARY

One implementation of the present disclosure is one or more non-transitory computer-readable storage media having instructions stored thereon that, when executed by one or more processors, cause the one or more processors to receive a request to hold a meeting in a building, the request including an individual, retrieve, from the request, contact information for the individual, transmit a request for identifying information to the individual using the contact information, determine a purpose of the individual based on the identifying information, generate a virtual ticket for the individual based on the purpose of the individual, identify a presence of the individual at the building based on the identifying information and image data, and control access control devices in response to identifying the presence of the individual to grant the individual access to the building.

In some embodiments, the identifying information received from the individual includes an image of the individual. In some embodiments, identifying the presence of the individual includes recognizing a face of the individual based on the image of the individual. In some embodiments, the identifying information received from the individual includes an alphanumeric identifier associated with the individual. In some embodiments, identifying the presence of the individual includes recognizing a license plate of a vehicle associated with the individual based on the alphanumeric identifier. In some embodiments, the purpose of the individual includes attending the meeting, wherein the request includes a conference room, and wherein the virtual ticket includes a location of the conference room, and wherein controlling the access control devices to grant the individual access to the building includes granting the individual access to the conference room and a physical route to the location of the conference room. In some embodiments, controlling the access control devices to grant the individual access to the building further includes controlling one or more access control devices associated with doors of the building. In some embodiments, the contact information includes an email address of the individual. In some embodiments, the one or more processors control the access control devices based on access rights associated with the individual.

Another implementation of the present disclosure is a method of visitor management including receiving a request to hold a meeting in a building, the request including an individual, retrieving, from the request, contact information for the individual, transmitting a request for identifying information to the individual using the contact information, determining a purpose of the individual based on the identifying information, generating a virtual ticket for the individual based on the purpose of the individual, identifying a presence of the individual at the building based on the identifying information and image data, and controlling access control devices in response to identifying the presence of the individual to grant the individual access to the building.

In some embodiments, the identifying information received from the individual includes an image of the individual. In some embodiments, identifying the presence of the individual includes recognizing a face of the individual based on the image of the individual. In some embodiments, the identifying information received from the individual includes an alphanumeric identifier associated with the individual. In some embodiments, identifying the presence of the individual includes recognizing a license plate of a vehicle associated with the individual based on the alphanumeric identifier. In some embodiments, the purpose of the individual includes attending the meeting, wherein the request includes a conference room, and wherein the virtual ticket includes a location of the conference room, and wherein controlling the access control devices to grant the individual access to the building includes granting the individual access to the conference room and a physical route to the location of the conference room. In some embodiments, controlling the access control devices to grant the individual access to the building further includes controlling one or more access control devices associated with doors of the building. In some embodiments, the contact information includes an email address of the individual. In some embodiments, the method includes controlling the access control devices based on access rights associated with the individual.

Another implementation of the present disclosure is a building management system (BMS) including one or more processing circuits and one or more computer readable storage media, the one or more computer readable storage media having instructions stored thereon that, when executed by the one or more processing circuits, cause the one or more processing circuits to receive a request to hold a meeting in a building, the request including an individual, retrieve, from the request, contact information for the individual, transmit a request for identifying information to the individual using the contact information, determine a purpose of the individual based on the identifying information, generate a virtual ticket for the individual based on the purpose of the individual, wherein the identifying information received from the individual includes an image of the individual, identify a presence of the individual at the building based on the identifying information and image data, wherein identifying the presence of the individual includes recognizing a face of the individual based on the image of the individual, and control access control devices based on access rights associated with the individual to grant the individual access to the building.

In some embodiments, the request includes a conference room, and wherein the virtual ticket includes a location of the conference room, and wherein controlling the access control devices to grant the individual access to the building includes granting the individual access to the conference room and a physical route to the location of the conference room.

BRIEF DESCRIPTION OF THE DRAWINGS

The above and other aspects and features of the present disclosure will become more apparent to those skilled in the art from the following detailed description of the example embodiments with reference to the accompanying drawings.

DETAILED DESCRIPTION

Referring generally to the FIGURES, a building system and method for providing intelligent security is shown and described, according to various exemplary embodiments. The building system includes a communications interface to provide for data exchange with one or more client device. The building system includes a visitor management system for managing access to one or more spaces of a building premises by visitors of the building premises. The visitor management system may receive, via the communications interface from an employee client device, a registration request. The registration request may be associated with a visitor to visit a building at a scheduled time. The visitor management system may transmit, via the communications interface to a visitor client device associated with the visitor, a link to a registration form. The visitor management system may receive, based on inputs to the registration form, visitor information. The visitor management system may provide a visitor virtual ticket to the visitor client device for accessing a space of the building premises during the scheduled time of the visit.

The systems and methods described herein provide for near-seamless access to a building and building spaces by visitors. Through recognition of visitors, physical barriers, security personnel, and various checkpoints within a building may be eliminated or reduced, thus decreasing bottlenecks for visitors. Various other benefits of the present disclosure are described in reference to the FIGURES below.

Figure 1A:
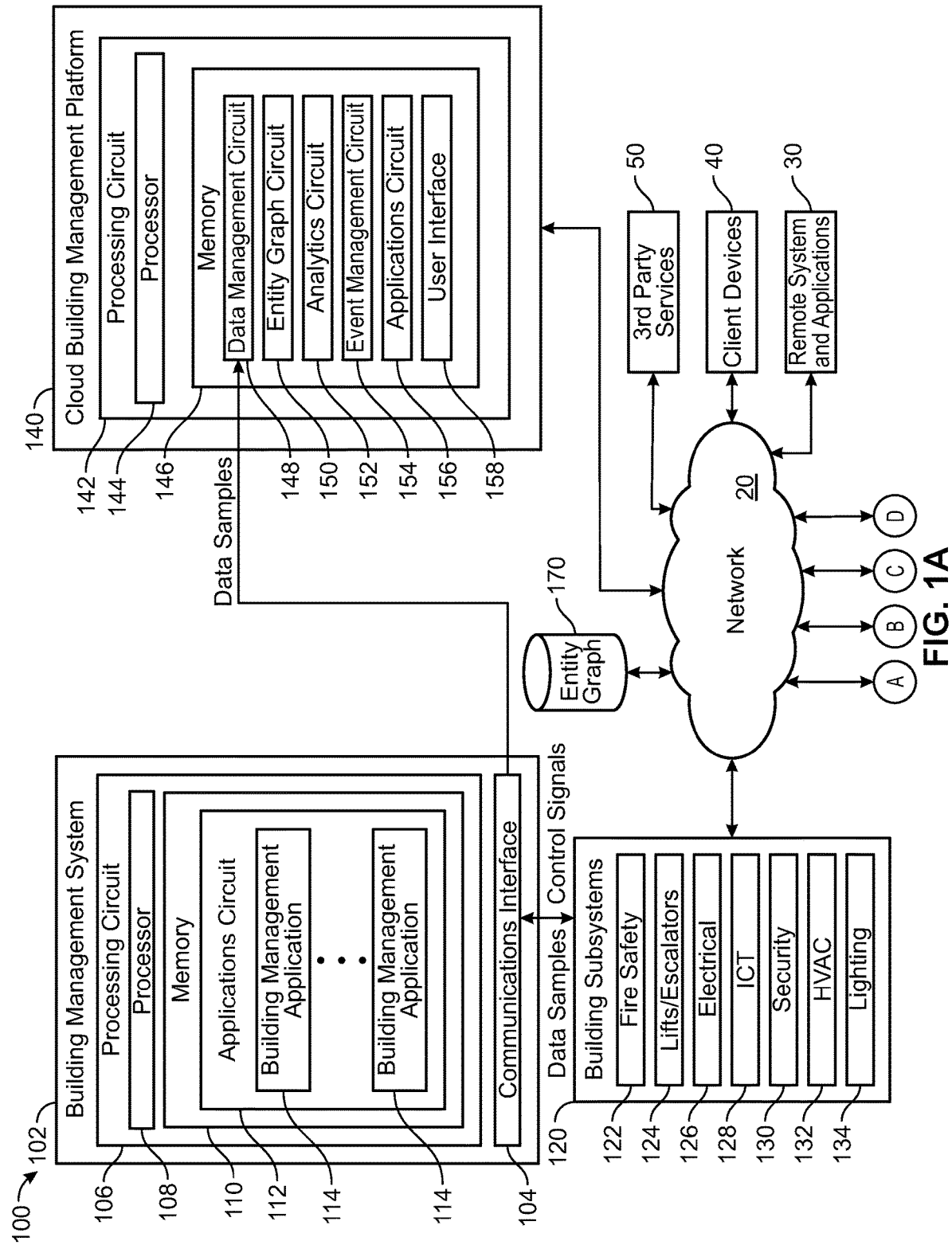
FIG. 1A is a block diagram of a smart building environment, according to an exemplary embodiment.
Figure 1B:
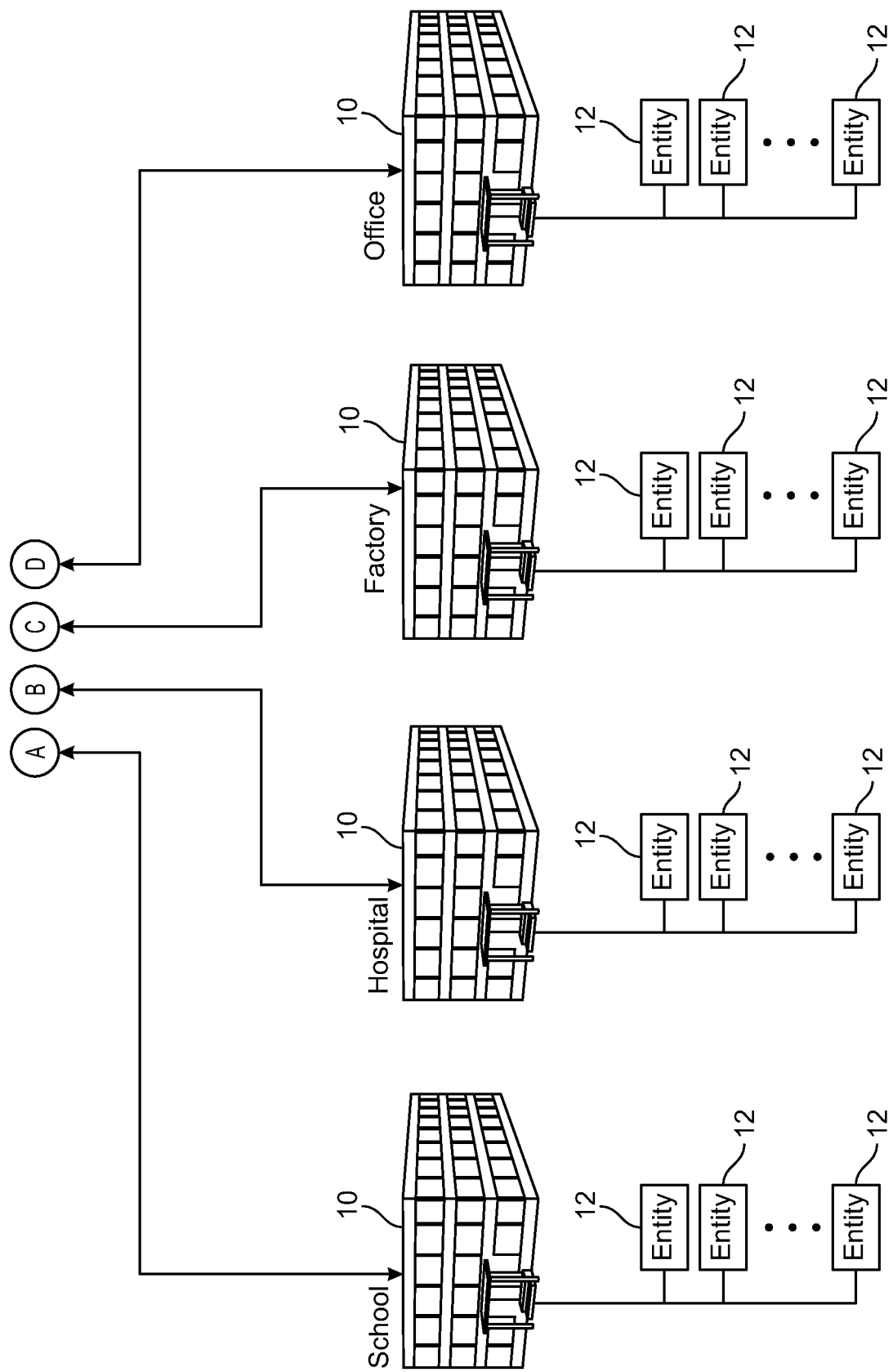
FIG. 1B is another block diagram of the smart building environment of FIG. 1A, according to an exemplary embodiment.

Hereinafter, example embodiments will be described in more detail with reference to the accompanying drawings. Referring now to FIGS. 1A-1B, a block diagram of a smart building environment 100 is shown, according to an exemplary embodiment. Smart building environment 100 is shown to include cloud building management platform 140. Cloud building management platform 140 may be configured to collect information from a variety of different data sources. Cloud management platform 140 may create digital representations, referred to as "digital twins," of physical spaces, equipment, people, and/or events based on the collected information. In various embodiments, the digital representations are stored in an entity graph. In brief overview, an entity graph is a data structure representing entities (e.g., spaces, equipment, people, events, etc.) and relationships between the entities. In various embodiments, the entity graph data structure facilitates advanced artificial intelligence and machine learning associated with the entities. In various embodiments, entities within the entity graph data structure include or are associated with "agents," or software entities configured to take actions with respect to the digital twins/real world entities with which they are associated. In some implementations, the agents may be configured to implement artificial intelligence/machine learning methodologies. The agents may be configured to facilitate communication and collection of information between the variety of different data sources. Each of the data sources may be implemented as, include, or otherwise use respective agents for facilitating communication amongst or between the data sources and cloud building management platform 140. The agents of cloud building management platform 140 and data sources may be configured to communicate using defined channels across which the agents may exchange information, messages, data, etc. amongst each other. In some examples, channels may be defined for particular spaces, subspaces, control loops, groups of equipment, people, buildings or groups of buildings, etc. In some implementations, agents may communicate by publishing messages to particular channels and subscribing to messages on particular channels and/or published by particular other agents/types of agents. In various embodiments, the data sources include buildings. For example, cloud building management platform 140 may interact with a number of buildings, each of which may include an agent (or a group of agents corresponding to various building subsystems within the respective building), to receive information. Hence, cloud building management platform 140 and the data sources may together form a network of agents to facilitate artificially intelligent exchange and communication of information across various channels. In some embodiments, one or more device(s), component(s), space(s) (and sets of devices, components, spaces) within cloud building management platform 140 may include a respective agent dedicated to perform various tasks associated therewith. The agents may therefore be dedicated for performing separate functions or tasks.

In various embodiments, cloud building management platform 140 collects data from buildings 10. For example, cloud building management platform 140 may collect data from buildings 10 such as a school, a hospital, a factory, an office building, and/or the like. It should be understood that the present disclosure is not limited to the number or types of buildings 10 shown in FIG. 1B. As new devices/components/spaces/buildings/events/control loops are added or otherwise incorporated into smart building environment 100, new digital representations (and associated agents, etc.) may be dynamically generated and incorporated into the entity graph data structure. Various examples of agents and corresponding networking may be found in U.S. patent application Ser. No. 15/934,593, filed Mar. 23, 2018, and titled "Building Management System with Dynamic Channel Communication", P.C.T. Application No. PCT/US2018/037,589, filed Jun. 14, 2018, and titled "Building Management System with Artificial Intelligence for Unified Agent Based Control of Building Subsystems," and U.S. patent application Ser. No. 16/036,685, filed Jul. 16, 2018, and titled "Systems and Methods for Agent Based Building Simulation for Optimal Control", the contents of each of which are incorporated herein by reference.

Buildings 10 may include entities 12. Entities 12 may include spaces, equipment, people, and/or events. In some embodiments, entities 12 include spaces such as floors, rooms, zones, campuses, buildings, and the like. In some embodiments, entities 12 include people such as employees, visitors, pedestrians, staff, and the like. In some embodiments, entities 12 include equipment such as inventory, assets, furniture, vehicles, building components, devices, and the like. For example, entities 12 may include devices such as internet of things (IoT) devices. IoT devices may include any of a variety of physical devices, sensors, actuators, electronics, vehicles, home appliances, and/or other items capable of communicating data over an electronic network (e.g., smart lights, smart appliances, smart home hub devices, etc.). In some embodiments, entities 12 include events such as meetings, fault indications, alarms, and the like. In various embodiments, cloud building management platform 140 receives information associated with buildings 10 and/or entities 12 and generates entity graph 170 based on the received information. Entity graph 170 may include digital twins that are digital representations of real world spaces, equipment, people, events, and/or the like. Entity graph 170 is described in greater detail below with reference to FIG. 3A-3B.

Smart building environment 100 may include building management system (BMS) 102. In various embodiments, BMS 102 communicates with cloud building management platform 140 to facilitate management and control of buildings 10 and/or the various operations described herein. BMS 102 may be configured to control, monitor, and/or manage equipment in or around a building or building area (e.g., such as buildings 10, etc.). For example, BMS 102 may include a HVAC system, a security system, a lighting system, a fire alerting system, and any other system that is capable of managing building functions or devices, or any combination thereof. Further, each of the systems may include sensors and other devices (e.g., IoT devices) for the proper operation, maintenance, monitoring, and the like of the respective systems. In some embodiments, each of buildings 10 is associated with a BMS 102. Additionally or alternatively, a single BMS 102 may manage multiple buildings 10. For example, a first BMS 102 may manage a first building 10, a second BMS 102 may manage a second building 10, and a third BMS 102 may manage the first and second buildings 10 (e.g., via the first and second BMS 102, in a master-slave configuration, etc.), as well as a third building 10. In various embodiments, BMS 102 communicates with building subsystems 120.

Building subsystems 120 may include fire safety subsystem 122, lift/escalators subsystem 124, building electrical subsystem 126, information communication technology (ICT) subsystem 128, security subsystem 130, HVAC subsystem 132, and/or lighting subsystem 134. In various embodiments, building subsystems 120 include fewer, additional, or alternative subsystems. For example, building subsystems 120 may additionally or alternatively include a refrigeration subsystem, an advertising or signage subsystem, a cooking subsystem, a vending subsystem, a printer or copy service subsystem, or any other type of building subsystem that uses controllable equipment and/or sensors to monitor or control a building 10. In some embodiment each of buildings 10 includes building subsystems 120. Additionally or alternatively, multiple buildings 10 may share at least some of building subsystems 120.

Each of building subsystems 120 may include any number of devices (e.g., IoT devices), sensors, controllers, and connections to facilitate functions and control activities. For example, HVAC subsystem 132 may include a chiller, a boiler, any number of air handling units, economizers, field controllers, supervisory controllers, actuators, temperature sensors, and other devices for controlling the temperature, humidity, airflow, or other variable conditions within buildings 10. Lighting subsystem 134 may include any number of light fixtures, ballasts, lighting sensors, dimmers, or other devices configured to controllably adjust the amount of light provided to a building space. Security subsystem 130 may include occupancy sensors, video surveillance cameras, digital video recorders, video processing servers, intrusion detection devices, access control devices and servers, or other security-related devices.

Cloud building management platform 140 and/or BMS 102 may interact with a variety of external systems. For example, cloud building management platform 140 may interact with remote systems and applications 30, client devices 40, and/or third party services 50. In various embodiments, systems and/or components of smart building environment 100 are configured to communicate using network 20. Network 20 may include hardware, software, or any combination thereof.

BMS 102 is shown to include communications interface 104 and processing circuit 106. Communications interface 104 may facilitate communications between BMS 102 and external systems/applications (e.g., cloud building management platform 140, remote systems and applications 30, client devices 40, third party services 50, building subsystems 120, etc.). Communications interface 104 may be or include wired or wireless communications interfaces (e.g., jacks, antennas, transmitters, receivers, transceivers, wire terminals, etc.) for conducting data communications within smart building environment 100 and/or with other external systems or devices. In various embodiments, communications via communications interface 104 is direct (e.g., local wired or wireless communications). Additionally or alternatively, communications via communications interface 104 may be via network 20 (e.g., a WAN, the Internet, a cellular network, etc.). For example, cloud building management platform 140 may communicate with BMS 102 using a wired connection and may communicate with client devices 40 (e.g., via BMS 102, etc.) using a cellular connection (e.g., a 4G or 5G access point/small cell base station, etc.). As a further example, communications interface 104 may include an Ethernet card and port for sending and receiving data via an Ethernet-based communications link or network. As a further example, communications interface 104 may include a Wi-Fi transceiver for communicating via a wireless communications network. As yet a further example, communications interface 104 may include cellular or mobile phone communications transceivers.

Processing circuit 106 may include processor 108 and memory 110. Processing circuit 106 may be communicably connected to communications interface 104 such that processing circuit 106 and the various components thereof can send and receive data via communications interface 104. Processor 108 may be implemented as a general purpose processor, an application specific integrated circuit (ASIC), one or more field programmable gate arrays (FPGAs), a group of processing components, or other suitable electronic processing components.

Memory 110 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 110 may be or include volatile memory or non-volatile memory. Memory 110 may include database components, object code components, script components, or any other type of information structure for supporting the various activities and information structures described in the present application. According to some embodiments, memory 110 is communicably connected to processor 108 via processing circuit 106 and includes computer code for executing (e.g., by processing circuit 106 and/or processor 108) one or more of the operations described herein.

In some embodiments, BMS 102 and/or cloud building management platform 140 are implemented within a single computer (e.g., one server, one housing, etc.). In various other embodiments BMS 102 and/or cloud building management platform 140 are distributed across multiple servers or computers (e.g., that can exist in distributed locations). In some embodiments, functions of BMS 102 and/or cloud building management platform 140 are implemented as agents. For example, BMS 102 may include a fault detection agent configured to analyze building data and detect faults associated with building components.

Memory 110 may include applications circuit 112 that may include building management application(s) 114. Building management application(s) 114 may include various systems to monitor and/or control specific processes/events within buildings 10. For example, building management application(s) 114 may include automated measurement and validation (AM&V), demand response (DR), fault detection and diagnostics (FDD), integrated control systems, and/or a building subsystem integration system. Building management application(s) 114 may be configured to receive inputs from building subsystems 120 and/or other data sources, determine improved and/or optimal control actions for building subsystems 120 based on the inputs, generate control signals based on the improved and/or optimal control actions, and provide the generated control signals to building subsystems 120.

Cloud building management platform 140 is shown to include processing circuit 142 having processor 144 and memory 146. In some embodiments, cloud building management platform 140 includes multiple processing circuits 142 each having one or more processors 144 and/or memories 146. Processor 144 may be a general purpose or specific purpose processor, an application specific integrated circuit (ASIC), one or more field programmable gate arrays (FPGAs), a group of processing components, or other suitable processing components. Processor 144 may be configured to execute computer code or instructions stored in memory 146 or received from other computer readable media (e.g., CDROM, network storage, a remote server, etc.).

Memory 146 may include one or more devices (e.g., memory units, memory devices, storage devices, etc.) for storing data and/or computer code for completing and/or facilitating the various processes described in the present disclosure. Memory 146 may include random access memory (RAM), read-only memory (ROM), hard drive storage, temporary storage, non-volatile memory, flash memory, optical memory, or any other suitable memory for storing software objects and/or computer instructions. Memory 146 may include database components, object code components, script components, or any other type of information structure for supporting the various activities and information structures described in the present disclosure. According to some embodiments, memory 146 is communicably connected to processor 144 via processing circuit 142 and includes computer code for executing (e.g., by processing circuit 142 and/or processor 144) one or more of the operations described herein.

Memory 146 may include data management circuit 148, entity graph circuit 150, analytics circuit 152, event management circuit 154, applications circuit 156, and/or user interface circuit 158. Data management circuit 148 may be configured to collect, manage, and/or retrieve data. In various embodiments, data management circuit 148 receives data samples from buildings 10 (e.g., via BMS 102, directly, etc.) and stores the data samples in structured storage. For example, the data samples may include data values for various data points. The data values may be measured and/or calculated values, depending on the type of data point. For example, a data point received from a temperature sensor may include a measured data value indicating a temperature measured by the temperature sensor. Data management circuit 148 may receive data samples from systems, components, and/or devices (e.g., IoT devices, sensors, etc.) within smart building environment 100 (e.g., remote systems and applications 30, client devices 40, third party services 50, BMS 102, building subsystems 120, etc.) and/or from external systems (e.g., the Internet, etc.). For example, data management circuit 148 may receive timeseries data from an occupancy sensor associated with one of buildings 10 and facilitate storage of the timeseries data in structured storage (e.g., in entity graph 170, etc.). As a further example, data management circuit 148 may receive an electronic calendar event (e.g., a meeting invitation, etc.) from one of client devices 40 and facilitate storage of the electronic calendar event in structure storage (e.g., in entity graph 170, etc.). In some embodiments, data management circuit 148 uses or retrieves an entity graph (e.g., via entity graph circuit 150, etc.) when organizing received data.

Entity graph circuit 150 may be configured to manage entity graph 170. In various embodiments, entity graph circuit 150 registers and manages various buildings (e.g., building 10, etc.), spaces, persons, subsystems (e.g., building subsystems 120, etc.), devices (e.g., IoT devices, etc.), events, and/or other entities in cloud building management platform 140. As described above, an entity may be any person, place, space, physical object, equipment, or the like. Further, an entity may be any event, data point, record structure, or the like. Entities and entity graph 170 are described in detail below with reference to FIGS. 3A-3B.

Analytics circuit 152 may be configured to analyze data to generate results. For example, analytics circuit 152 may analyze sensor data (e.g., weight measurements, image data, audio data, etc.) from a building lobby to identify a user. As a further example, analytics circuit 152 may apply fault detection rules to timeseries data from an HVAC system to detect a fault associated with the HVAC system. In various embodiments, analytics circuit 152 performs operations on information stored in entity graph 170. For example, analytics circuit 152 may traverse entity graph 170 to retrieve context information (e.g., energy usage, event activity, occupancy sensor data, HVAC control schedules, etc.) associated with one of buildings 10, and analyze the context information to determine a user schedule associated with the building (e.g., when the building is most heavily in use, etc.).

Event management circuit 154 may be configured to generate actions. For example, event management circuit 154 may receive event data from building subsystems 120 (e.g., a security alarm, etc.), and generate a response based on the event data (e.g., cause BMS 102 to sound an alarm, etc.). In various embodiments, event management circuit 154 generates actions dynamically. For example, event management circuit 154 may include artificially intelligent agents configured to generate actions in real-time based on received input. For example, event management circuit 154 may include an AI agent that dynamically generates a notification to an interested party in response to receiving an indication of an identified individual. As a further example, event management circuit 154 may receive a prediction from analytics circuit 152 that a building component is about to enter a fault state and may dynamically generate a work order ticket for the building component in response to the received prediction.

Applications circuit 156 may be configured to facilitate a variety of applications associated with cloud building management platform 140. For example, applications circuit 156 may facilitate a smart messaging system, a personal comfort system, a health and wellness system, a smart parking lot system, a smart signage system, a smart lobby system, a smart meeting room system, an employee productivity system, and/or the like. In various embodiments, applications circuit 156 facilitates operation of various systems that integrate with smart building environment 100. For example, applications circuit 156 may facilitate a FDD system that receives data from buildings 10 and generates fault indications associated with buildings 10.

User interface 158 may be configured to facilitate user interaction with cloud building management platform 140 and/or BMS 102. For example, a user may update personalized preferences associated with operation of cloud building management platform 140 via user interface 158. In some embodiments, user interface 158 facilitates dynamic feedback (e.g., a natural user interface, etc). For example, user interface 158 may facilitate chatbot interaction, voice commands, user authentication, biometric feedback, or the like.

Figure 2:
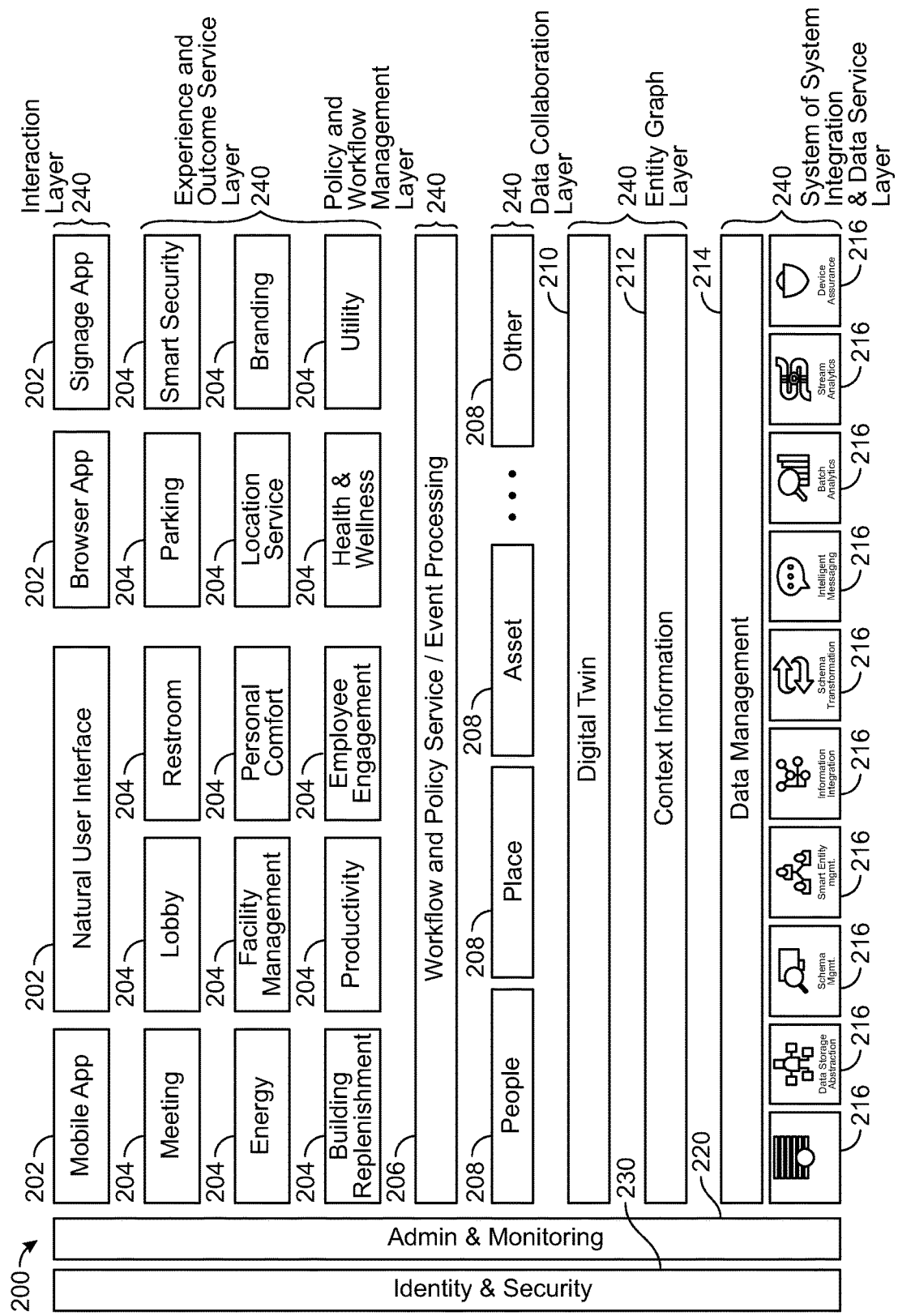
FIG. 2 is a block diagram of a building data platform associated with the smart building environment of FIG. 1, according to an exemplary embodiment.

Referring now to FIG. 2, a building data platform 200 associated with the smart building environment 100 is shown, according to an exemplary embodiment. In various embodiments, cloud building management platform 140 implements the architecture of building data platform 200. Building data platform 200 is shown to include various layers 240. For example, layers 240 may include an interaction layer, an experience and outcome service layer, a policy and workflow management layer, data collaboration layer, entity graph layer, and/or a system of system integration and data service layer. In various embodiments, building data platform 200 includes interface(s) 202. For example, interface(s) 202 may include a mobile phone application, a natural user interface (e.g., voice recognition, chatbot services, text recognition, etc.), a browser application, a signage system, and/or the like. Interface(s) 202 may facilitate human-to-machine interaction, information visualization, and user experience functions.

In various embodiments, building data platform 200 includes service(s) 204. Service(s) 204 may include various user deliverables (e.g., outcomes, experiences, etc.) facilitated by building data platform 200. For example, service(s) 204 may include meeting scheduling, energy management, building supplies replenishment, lobby management (e.g., tracking a number of individuals in a building lobby and responding based on the number of individuals, etc.), facility management, productivity features (e.g., measuring and reporting on employee productivity, generating productivity suggestions, etc.), restroom management (e.g., monitoring a cleanliness of building restrooms, etc.), personal comfort management (e.g., adjusting building parameters based on occupant comfort preferences, etc.), employee engagement features (e.g., monitoring and reporting on employee engagement, generating engagement suggestions, etc.), parking management (e.g., dynamically assigning parking spaces, etc.), location services (e.g., generating actions based on users' locations, etc.), health and wellness features (e.g., monitoring and reporting on employee health and wellness, generating health and wellness suggestions, etc.), smart security (e.g., dynamically identifying individuals within a building, monitoring security parameters associated with a building, etc.), branding features (e.g., dynamic digital signage updating based on an identity of a viewer, etc.), and/or utility features (e.g., monitoring and reporting on building utility usage, generating suggestions to reduce utility consumption and/or cost, etc.). In various embodiments, service(s) 204 generate a virtual view of data from data collaboration, business workflows, and downstream sub-systems (e.g., sensors, actuators, etc.).

In various embodiments, building data platform 200 includes event processing 206. Event processing 206 may facilitate generating actions based on received data. For example, event processing 206 may receive an indication of an event within buildings 10, retrieve information associated with the event, and trigger a set of predefined workflows to perform management policies. In various embodiments, event processing 206 includes complex event processing and/or a business workflow processing engine (e.g., a rules engine, etc.) integrated with messaging and data models (e.g., event data models, etc.).

In various embodiments, building data platform 200 includes data source(s) 208. For example, data source(s) 208 may include data associated with people, places, assets, and/or the like. In various embodiments, building data platform 200 interacts with digital twins included in entity graph 170. For example, building data platform 200 may project a digital twin into a virtual data view to facilitate service(s) 204. Data source(s) 208 may manage a database view of digital representation of people, places and assets. In various embodiments, data source(s) 208 represent heterogenous source data schema as an open source common data model (e.g., a Brick Schema/extensions, etc.).

In various embodiments, entity graph layer 240 includes digital twin 210 and context information 212. Digital twin 210 is a digital representation of spaces, assets, people, events, and/or anything associated with a building or operation thereof. In various embodiments, digital twin 210 is modeled in entity graph 170. In various embodiments, digital twins 210 include an active compute process. For example, a digital twin 210 may communicate with other digital twins 210, and to sense, predict and acts. In various embodiments, digital twin 210 is generated dynamically. For example, a digital twin 210 corresponding to a conference room may update its status by looking at occupancy sensors or an electronic calendar (e.g., to turn its status "available" if there is no show, etc.). In various embodiments, digital twin 210 and/or entity graph 170 include context information 212. Context information 212 may include real-time data and a historical record of each system in the environment (e.g., campus, building, facility, space, etc.). Context information 212 may be stored in entity graph 170. In various embodiments, context information 212 facilitates flexible data modeling for advanced analytics and AI application in scenarios that model highly interconnected entities.

In various embodiments, building data platform 200 includes data management 214 and/or operation(s) 216. Data management 214 may manage, retrieve, and transmit data to various systems. For example, data management 214 may retrieve and transmit data integration protocols to OT sub-systems. Operation(s) 216 may include data storage attribution, schema management, smart entity management, information integration, schema transformation, intelligent messaging, batch analytics, stream analysis, and/or device assurance.

In various embodiments, building data platform 200 includes administration and monitoring 220 and/or identity and security 230. Administration and monitoring 220 may facilitate various administrative functions and/or operations. For example, an administrator may view memory allocation analytics associated with building data platform 200 (e.g., how much memory does entity graph 170 occupy, etc.). Identity and security 230 may facilitate various security features. For example, identity and security 230 may encrypt personally identifiable information (PII) included in digital twin 210.

Figure 3A:
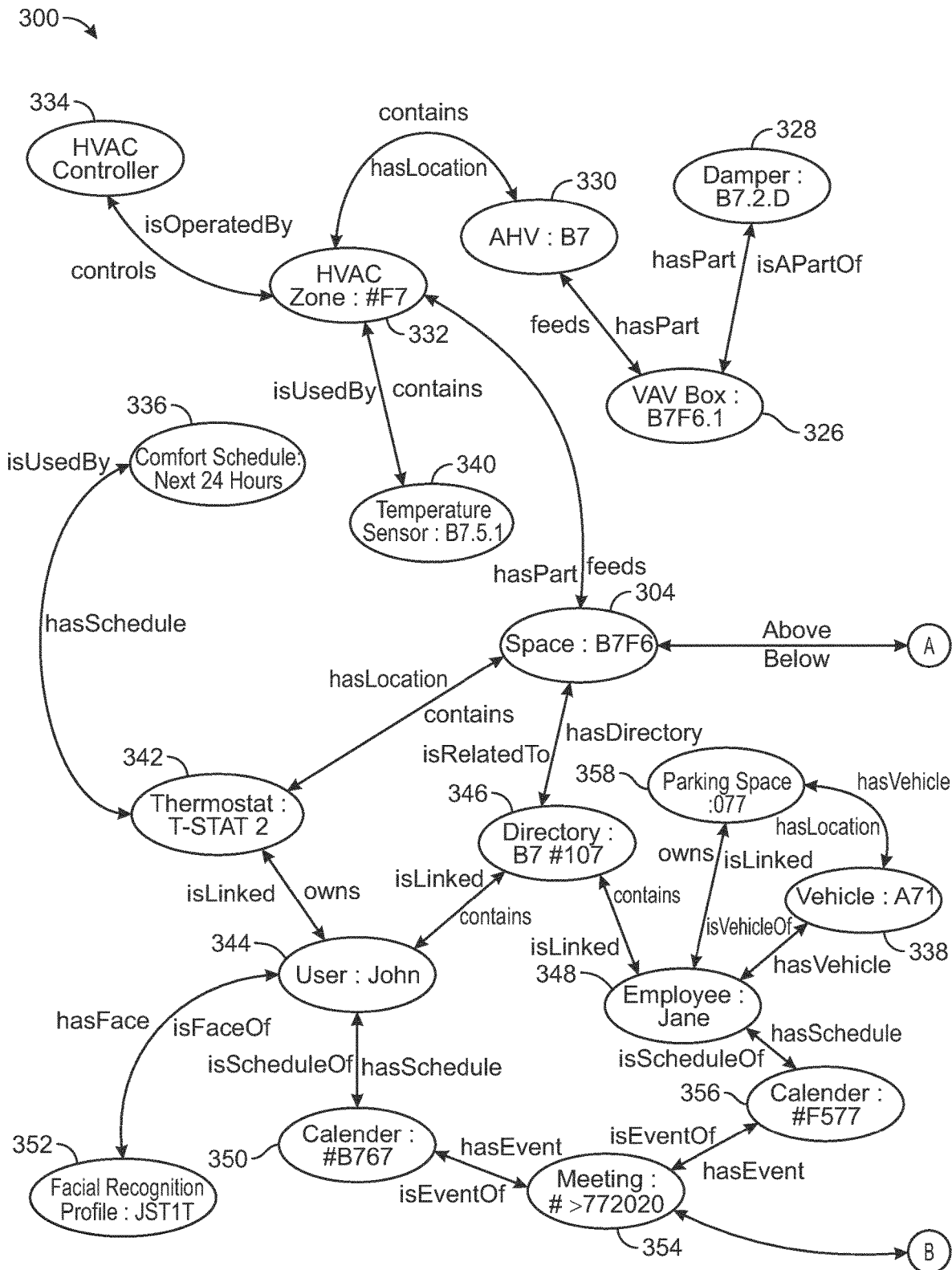
FIG. 3A is a block diagram of an entity graph, according to an exemplary embodiment.
Figure 3B:
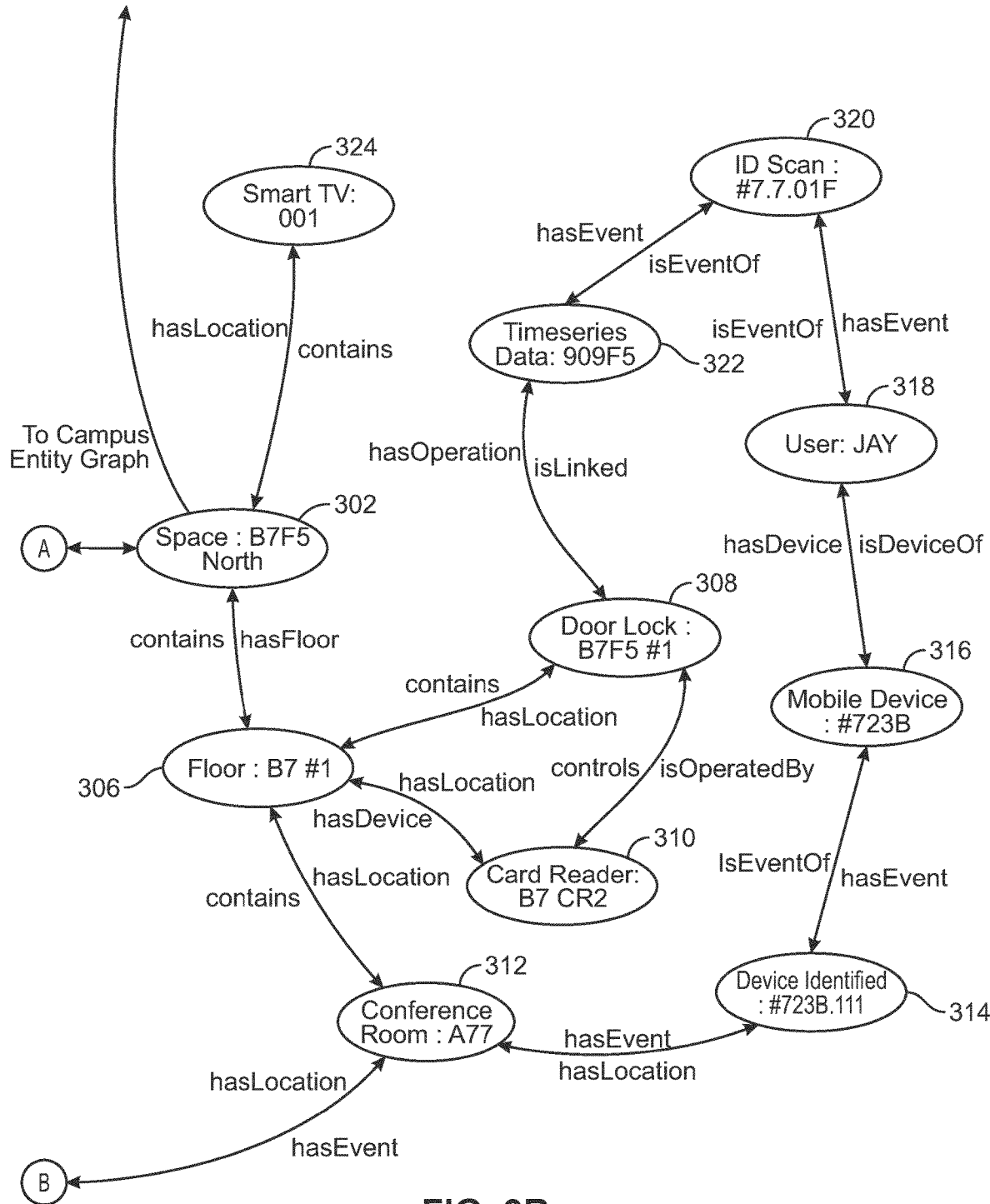
FIG. 3B is another block diagram of the entity graph of FIG. 3A, according to an exemplary embodiment.

Referring now to FIGS. 3A-3B, an entity graph 300 is shown in greater detail, according to an exemplary embodiment. In brief overview, entity graphs such as entity graph 170 and/or entity graph 300 are structured data stored in memory (e.g., a database, memory 146, etc.). Entity graphs such as entity graph 300 and/or entity graph 170 may include digital twins. Digital twins may be digital representations of real world spaces, equipment, people, and/or events. In various embodiments, digital twins represent buildings, building equipment, people associated with buildings, and/or events associated with buildings (e.g., buildings 10, etc.). An entity graph may include nodes and edges, where each node of the entity graph represents an entity and each edge is directed (e.g., from a first node to a second node) and represents a relationship between entities (e.g., indicates that the entity represented by the first node has a particular relationship with the entity represented by the second node). For example, an entity graph may be used to represent a digital twin of a person.

Entities can be things and/or concepts related to spaces, people, and/or asset. For example, the entities could be "B7F4 North", "Air Handling Unit," and/or "meeting room." The nodes can represent nouns while the edges can represent verbs. For example, the edges can be "isA," "hasPart," and/or "feeds." In various embodiments, the edges represent relationships. While the nodes represent the building and its components, the edges describe how the building operates. The nodes and edges together create a digital twin of a particular building. In some embodiments, the entities include properties or attributes describing the entities (e.g., a thermostat may have a particular model number attribute). The components of the entity graph form large networks that encode semantic information for a building.

The entity graph is configured to enable flexible data modeling for advanced analytics, control, and/or artificial intelligence applications, in some embodiments. These applications may require, or benefit from information modeling including interconnected entities. Other data modeling techniques based on a table, a hierarchy, a document, and/or a relational database may not be applicable. The entity graph can be a foundational knowledge management layer to support other higher level applications, which can be, complex root cause, impact analysis, building powerful recommendation engines, product taxonomy information services, etc. Such a multilayer system, a system of system topologies, can benefit from an underlying entity graph.

The entity graph can be a data contextualization layer for all traditional and/or artificial intelligence applications. The entity graph can be configured to capture evidence that can be used to attribute the strengths of entity relationships within the entity graph, providing the applications which utilize the entity graph with context of the systems they are operating. Without context (e.g., who the user is, what the user is looking for, what the target of a user request is, e.g., find a meeting room, increase a temperature in my office) these applications may never reach their full potential. Furthermore, the entity graph provides a native data structure for constructing question and answer type systems, e.g., a chatbot, that can leverage and understand intent.

The entity graph may not be a configuration database but may be a dynamic representation of a space, person, event, and the like. The entity graph can include operational data from entities which it represents, e.g., sensors, actuators, card access systems, occupancy of a particular space, thermodynamics of the space as a result of actuation, etc. The entity graph can be configured to continually, and/or periodically, ingest new data of the space and thus the entity graph can represent a near real-time status of cyber-physical entities and their inter-relationships. For this reason, artificial intelligence can be configured to introduce a virtual entity and new semantic relationships among entities, in some embodiments.

The entity graph is configured to facilitate adaptive controls, in some embodiments. The entity graph can be configured to adapt and learn over time. The entity graph can be configured to enable dynamic relationships between building information and other facility and enterprise systems to create new insights and drive new optimization capabilities for artificial intelligence systems. As relationships can be learned over time for the entity graph, the artificial intelligence systems and also learn overtime based on the entity graph. Entity graphs (e.g., space graphs, etc.) are described in greater detail with reference to U.S. patent application Ser. No. 16/260,078, filed on Jan. 28, 2019, the entire disclosure of which is incorporated by reference herein.

Entity graph 300 includes entities 302-358 (stored as nodes within entity graph 300) describing spaces, equipment, events, and people (e.g., business employees, etc.). In various embodiments, entities 302-358 are associated with or otherwise include agents (e.g., agents may be assigned to/associated with entities, etc.). Additionally or alternatively, agents may be represented as nodes in entity graph 300 (e.g., agent entities, etc.). Furthermore, relationships are shown between entities 302-358 directionally describing relationships between two of entities 302-358 (stored as edges within entity graph 300). In various embodiments, cloud building management platform 140 may traverse entity graph 300 to retrieve a description of what types of actions to take for a certain device, what the current status of a room is (e.g., occupied or unoccupied), etc.

As an example, entity graph 300 illustrates an office space called "B7F5 North" of a building. A smart TV referred to as "Smart TV 001" has a directional relationship to the space referred to as "B7F5 North." The relationship may be an edge "hasLocation" indicating that the device (e.g., the smart TV represented by entity 324) has a location (e.g., the space represented by entity 302). Furthermore, a second edge "contains" from entity 302 to entity 324 indicates that the location (e.g., the space represented by entity 302) includes the device (e.g., the smart TV represented by entity 324). In some embodiments, entity graph circuit 150 generates the nodes of entity graph 300 from various data sources including a building automation system, a security system, a fire alarm, human resources system, and/or building information model (BIM) files (e.g., through an entity name matching process, etc.). Furthermore, semantic relationships may be extracted from the building information by entity graph circuit 150. In some embodiments, only a single relationship exists between entities. In some embodiments, nodes and edges are determined dynamically as building data that is received and ingested into entity graph 300. For example, cloud building management platform 140 is configured to identify a door lock and card reader and generate a number of nodes and edges in entity graph 300 representing the card reader controller operation of the door lock.

Systems and Methods for Visitor Management

Various embodiments disclosed herein describe example implementations of a smart visitor management system. The smart visitor management system described herein may facilitate individual user experiences. For example, a smart visitor management system may identify a visitor to a building and dynamically grant the visitor access to the building according to the visitor's purpose. In some embodiments, a smart visitor management system may identify a visitor and a scheduled meeting associated with the visitor, retrieve security information associated with the visitor, and grant the visitor access to portions of a building associated with a location of the scheduled meeting. In various embodiments, the smart visitor management system described herein may integrate/interface with an external system (e.g., cloud building management platform 140, entity graph 170, etc.). For example, the smart visitor management system may reference entity graph 170 to facilitate user identification. In various embodiments, the smart visitor management system described herein facilitates frictionless access to a campus, building, parking lot, and/or parking space.

As a non-limiting example, a smart visitor management system may receive a request to hold a meeting in a building, the request including a visitor to the building. The smart visitor management system may retrieve, from the request, contact information for the visitor. For example, the smart visitor management system may retrieve an email address or phone number associated with the visitor. The smart visitor management system may transmit a request for identifying information to the individual using the retrieved contact information. For example, the smart visitor management system may transmit an email to the visitor using the email address associated with the visitor, the email facilitating the visitor to submit identifying information (e.g., a picture, an identifier, etc.). In response to the request for identifying information, the smart visitor management system may receive identifying information from the visitor. For example, the visitor may send a reply email including a picture of themselves. In some embodiments, the smart visitor management system determines a purpose of the individual (e.g., a reason for their visit, etc.) based on the identifying information. For example, the smart visitor management system may query a digital twin associated with the individual to determine a meeting that the individual is attending. The smart visitor management system may generate a virtual ticket for the visitor based on the received identifying information. The virtual ticket may grant the visitor access to portions of the building associated with a location of the meeting during a time period associated with the meeting. The smart visitor management system may identify a presence of the visitor at the building based on the identifying information. For example, when the visitor arrives at a lobby of the building the visitor management system may capture an image of the visitor and use facial recognition to match the face of the visitor to a picture supplied by the individual as identifying information. The visitor management system may dynamically control access control devices to grant the visitor access to the building. For example, the visitor management system may unlock doors leading to a location of the meeting within the building.

Figure 4:
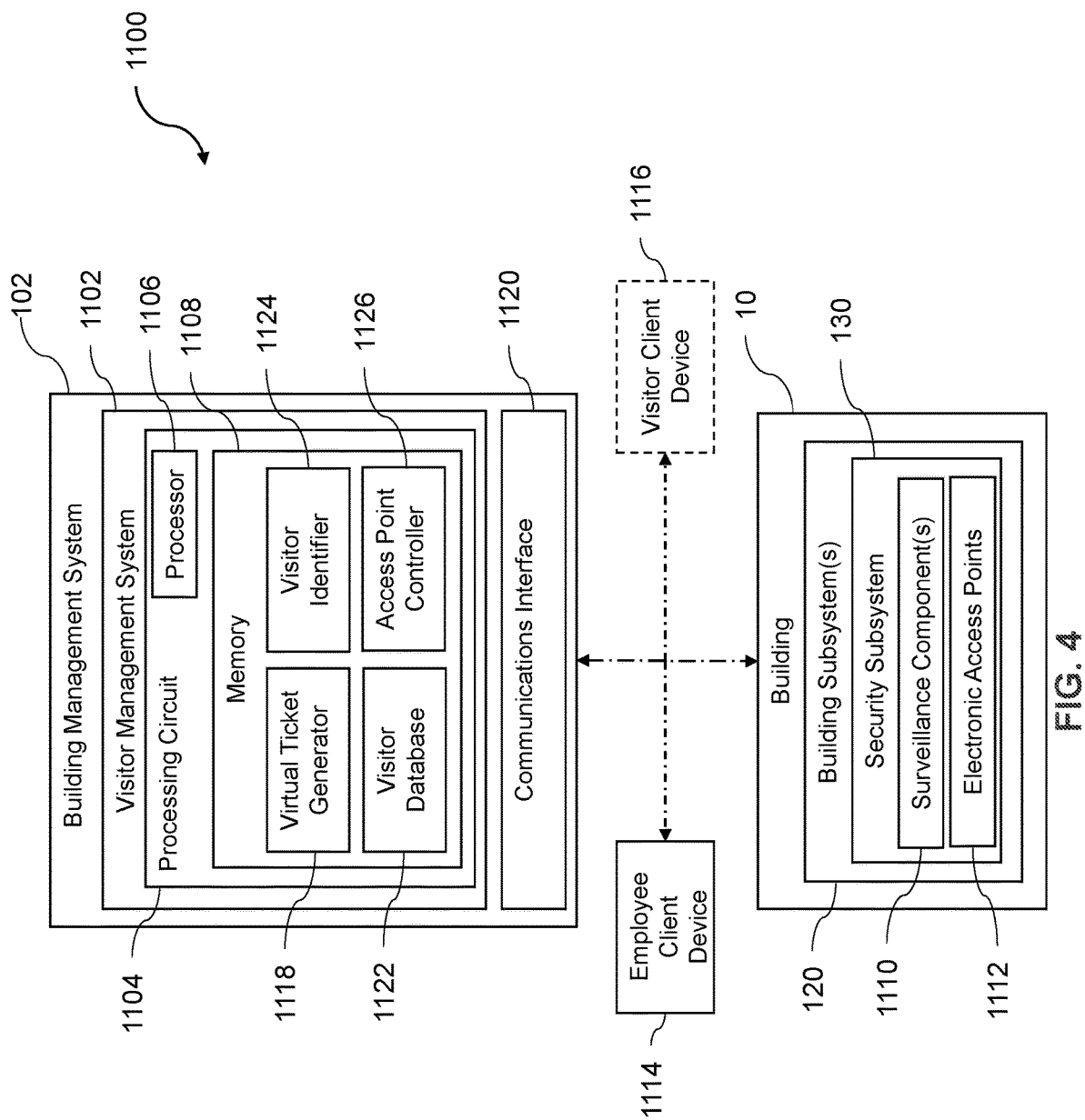
FIG. 4 is a block diagram of a system for visitor management, according to an exemplary embodiment.

Referring now to FIG. 4, the building management platform is shown in greater detail. Specifically, FIG. 4 depicts a block diagram of a system 1100 for visitor management is shown, according to an exemplary embodiment. The present application is related to Provisional Application No. 62/794,370, titled "Smart Building Automation System With Digital Twin Configuration and Analytics," filed on Jan. 18, 2019, the entire disclosure of which is incorporated herein by reference. In some embodiments, one or more features of the present application may be implemented according to one or more features of the smart building automation system described therein. The system 1100 is shown to include the building management system 102 and a building 10. As described above, the building management system 102 may be configured to receive data from various building subsystems 120, entities 12 of the building 10, among other data sources. The building management system 102 may be configured to process the data received from such data sources.

The system 1100 is shown to include a visitor management system 1102. In some embodiments, the visitor management system 1102 may be implemented on or within or otherwise incorporated into the building management system 102 shown in FIG. 1A and described with reference thereto. In various implementations, the visitor management system 1102 may be incorporated into other device(s) or component(s) described above, such as the cloud building management platform 140, and components thereof.

The building 10 is shown to include one or more building subsystems 120. The building subsystem(s) 120 may be or include those depicted in FIG. 1A including, but not limited to, fire safety subsystem 122, lifts/escalators subsystem 124, electrical subsystem 126, ICT subsystem 128, security subsystem 130, HVAC subsystem 132 and/or lighting subsystem 134. As described in greater detail below, security subsystem 130 may include various surveillance components 1110 and electronic access points 1112.

Generally speaking, the visitor management system 1102 may be configured to provide receive registration requests corresponding to visitors from an employee client device 1114. The visitor management system 1102 may be configured to generate a visitor virtual ticket, which is provided to the visitor. The visitor may use the visitor virtual ticket for accessing various spaces on or within the building 10 premises, as described in greater detail below.

The building management system 102 is shown to include a processing circuit 1104. The processing circuit 1104 may be similar in at least some aspects to processing circuit 106 described above with reference to FIG. 1A. In some implementations, the building management system 102 may be incorporated into or a component of cloud building management platform 140 described above with reference to FIG. 1A. The processing circuit 1104 includes a processor 1106 and memory 1108. The processor 1106 may be similar in at least some aspects to processor 108 of FIG. 1A. The memory 1108 may be similar in at least some aspects to memory 110 of FIG. 1A.

The building management system 102 may be communicably coupled to the building subsystems 120 including the security subsystem 130. The building management system 102 may be communicably coupled to the building subsystems 120 via a network (such as network 20). The network may be a Wide Area Network (WAN), a cellular network, or other network configured to facilitate exchange of information between two or more devices located remotely from one another across a medium (such as wired or wireless mediums including, but not limited to, the internet).

The security subsystem 130 is shown to include one or more surveillance components 1110. The surveillance component(s) 1110 may be any device(s) or component(s) configured to monitor, observe, detect, or otherwise surveil persons entering or within the building 10. The surveillance component(s) 1110 may be arranged at various locations in, around, or within the building 10 premises such as, for instance, at the entrance to a parking area (e.g., a parking lot or structure) for the building, at the entrance of the building 10, on or adjacent to various doors within the building 10, etc. Hence, the surveillance component(s) 1110 may be configured to generate data corresponding to traffic into the parking area, at the entrance of the building 10, or into or out of various rooms. The surveillance component(s) 1110 may be configured to generate data corresponding to the persons (e.g., visitors and employees) entering the building 10 premises. The surveillance component(s) 1110 may be configured to provide the generated data to the building management system 102 for identifying the persons entering or within the building 10.

In some embodiments, the surveillance component(s) 1110 may include device scanners configured to detect a presence, proximity, or location of a client device associated with persons in the building 10 (or on the premises of the building, spaces within the building 10, etc.). The device scanners may be or include Wi-Fi, BLUETOOTH®, near-field communications (NFC) devices, RFID scanners, or other scanners configured to detect a client device connected to a network of the building 10 or otherwise in communication with the device scanner. In some embodiments, the client device may store a virtual ticket or pass (e.g., in a digital wallet). Upon scanning the client device at the device scanner, the client device may pass the virtual ticket or pass from the digital wallet to the device scanner. The device scanners may be configured to receive data corresponding to client devices which are connected, registered, or otherwise detected via the scanners. Such data may include, for instance, the virtual ticket or pass, as described in greater detail below.

The surveillance component(s) 1110 may include camera(s) arranged to capture images of the person(s) entering the building 10. In some embodiments, the camera(s) may be arranged to capture images of the person's vehicle upon entering the premises of the building 10 (e.g., a parking lot or structure, passing a checkpoint prior to entering the parking lot or structure, etc.). The camera(s) may be arranged to capture images of a license plate or registration plate of the vehicle. In some embodiments, the camera(s) may be arranged to capture images of the person's face upon entering the premises of the building 10 (e.g., within their vehicle, while exiting the vehicle and walking toward the building 10, walking into the building 10, in the lobby, spaces within the building 10, etc.).

The surveillance component(s) 1110 may include biometric sensors configured to generate biometric information corresponding to person(s) in the building 10 (or on the premises of the building). The biometric sensors may include fingerprint scanners, retina scanners, etc. Upon entering the building 10 (or premises of the building 10, spaces within the building 10, etc.), the person may scan their fingerprint, retina, etc. via the biometric sensor(s). The biometric sensor(s) may be configured to generate data corresponding to biometric features of the person.

The surveillance component(s) 1110 may include key-card, barcode, QR code scanners configured to detect a card, a code on a card, a communications device or chip incorporated into a card, etc. swiped or otherwise scanned by person(s) upon entering the building 10. Upon entering the building 10 (or premises of the building 10, spaces within the building 10, etc.), the person may scan a badge or key card via the scanner(s). The scanner(s) may be configured to generate data corresponding to the badge or key card scanned by the person(s).

In each of the embodiments described above, the surveillance component(s) 1110 may be configured to generate data corresponding to persons entering the premises of the building 10 including entering the parking lot or structure, entering the building 10, entering various rooms or spaces within the building 10, etc. The surveillance component(s) 1110 may be configured to provide the data to the building management system 102. In some embodiments, an agent dedicated to a respective surveillance component 1110 (or set of surveillance components 1110) may be configured to provide, transmit, or otherwise deliver the data to an agent of the building management system 102. The agent for the surveillance component(s) 1110 may deliver the data across a respective channel (which may be a secure channel) which is provided to facilitate communication between the building management system 102 and surveillance component(s) 1110. The surveillance component(s) 1110 (and other components, systems, devices, etc. within the building subsystems 120) may be configured to provide data to the visitor management system 1102 via a network, such as a Local Area Network (LAN), Wide Area Network (WAN), cellular network, or other network configured to provide or facilitate communication between two end points (e.g., across a channel).

The security subsystem 130 is shown to include one or more electronic access points 1112. The electronic access points 1112 may be or include any device(s) or components configured to receive signals for selectively permitting or denying access to one or more locations in or within the building 10. In some embodiments, the electronic access points 1112 may be electronically controlled locks, motorized gates or doors, etc. The electronic access points 1112 may be arranged or positioned at or on various entry points for the building 10 including, for instance, at an entrance of the parking area for the building 10, the building 10, and/or rooms within the building 10. Hence, the electronic access points 1112 may be configured to control access to the parking area for the building 10, the entrance (or lobby) of the building 10, and/or one or more rooms within the building 10. The electronic access points 1112 may be configured to selectively lock and unlock various portions or spaces of the building 10 premises responsive to receiving corresponding signals (e.g., from the visitor management system 1102, as described in greater detail below).

As described in greater detail below, the visitor management system 1102 may be configured to analyze the data received from the surveillance component(s) 1110 for generating identification data corresponding to visitor(s) seeking entrance to the premises of the building 10. The visitor management system 1102 may permit (or deny) the visitor(s) access to various locations or spaces in, around, or within the building 10, as described in greater detail below.

The system 1100 is shown to include an employee client device 1114. The employee client device 1114 may be similar in some aspects to the client devices 40 described above with reference to FIG. 1A. The employee client device 1114 may be a personal computer, laptop, tablet, mobile device (e.g., smartphone), etc. The employee client device 1114 may be configured to receive inputs (e.g., via a user interface) from an employee. Each employee client device 1114 may correspond to a particular employee.

The system 1100 is shown to include a visitor client device 1116. The visitor client device 1116 may be similar to the employee client device 1114 described above. Hence, the visitor client device 1116 may be a personal computer, laptop, tablet, mobile device (e.g., smartphone), etc. Each visitor who visits the building 10 may bring with them their corresponding visitor client device 1116. As described in greater detail below, the visitor client device 1116 may be used for accessing various areas/spaces/etc. on or within the building 10 premises.

The visitor client device 1116 (and employee client device 1114) may include a digital wallet. The digital wallet may be an application, agent, or terminal residing on the client device 1116 and configured to store encrypted information. In some embodiments, the digital wallet may be configured to store a virtual ticket (e.g., from the visitor management system 1102 or similar system for employees). The virtual ticket may be passed, provided, or otherwise validated by surveillance components 1110 within the building as the visitor carrying the client device 1116 positions the client device 1116 near the surveillance components 1110. The virtual ticket may be used to provide seamless access to the visitor of the building 10 premises (during their visit), as described in greater detail below.

The building management system 102, employee client device 1114, visitor client device 1116, and building subsystems 120 may be communicably coupled to one another. In some embodiments, the building management system 102 may include a communications interface 1120 configured to facilitate communication between the device(s)/component(s) of the system 1100 described herein. The communications interface 1120 may be similar in some aspects to communications interface 104 described above with reference to FIG. 1A. The communications interface 1120 may facilitate wired or wireless communication between the device(s)/component(s).

The memory 1108 is shown to include various applications. The applications may be or include sets of instructions for performing various functions. In some embodiments, the applications may be implemented as agents within the visitor management system 1102. Each of the agents may be dedicated to performing particular functions. In such embodiments, the visitor management system 1102 may include a plurality of agents. In some embodiments, each agent may include separate processor(s) and memory for performing such dedicated functions. The processor 1106 may be configured to use the instructions from the applications or agents for performing the functions described herein. Each of the applications or agents may be separate from one another. In some embodiments, some of the applications or agents may be grouped together to form a single application. Hence, the present disclosure is not limited to the particular arrangements depicted in FIG. 4. To the contrary, in some implementations, the agents may be stored remotely from the visitor management system 1102. In such implementations, the visitor management system 1102 may offload various tasks or functions to dedicated agents via, for instance, a network.

The memory 1108 is shown to include a virtual ticket generator 1118. The virtual ticket generator 1118 may be an application or dedicated agent implemented within or communicably coupled to (e.g., via a dedicated channel) the visitor management system 1102. The virtual ticket generator 1118 may be configured to generate a visitor virtual ticket to visitor client device(s) 1116. Generally speaking, the virtual ticket generator 1118 may be configured to receive a registration request corresponding to a visitor from an employee (e.g., via the employee client device 1114). The virtual ticket generator 1118 may be configured to transmit a link to a registration form to the visitor client device 1116 for the visitor. The virtual ticket generator 1118 may be configured to receive visitor information based on inputs to the registration form (e.g., provided by the visitor to the registration form via the visitor client device 1116). The virtual ticket generator 1116 may generate the virtual ticket based on the visitor information (and information received within the registration request). The virtual ticket generator 1116 may provide the virtual ticket to the visitor client device 1116. Each of these tasks performed by or via the virtual ticket generator 1118 are described in greater detail below.

The virtual ticket generator 1118 may be configured to receive a registration request corresponding to a visitor from an employee (e.g., via the employee client device 1114). The registration request may be generated by the employee on their employee client device 1114. The employee may access an employee portal for the visitor management system 1102. The employee portal may be configured to provide for communication and exchange of data between the visitor management system 1102 and the employee client device 1114. The registration request may include visit information corresponding to the visitor. For instance, the visit information may include the visitor name, visit date, time, and duration, an identification of the visitor client device 1116 (e.g., phone number, e-mail address), etc. The employee may provide such visit information to on their employee client device 1114 upon generating the registration request. In some embodiments, employee client device 1114 and/or visitor client device 1116 may not be part of visitor management system 1102, but may be user devices such as smartphone from which visitor management system 1102 receives input data.

In some embodiments, the visit information may be automatically populated by the virtual ticket generator 1118. For instance, the virtual ticket generator 1118 may be communicably coupled to a server which stores data corresponding to a calendar or schedule for the employee. Where a new meeting with a third-party is received by server from the employee client device 1114, the virtual ticket generator 1118 may be configured to automatically extract the visit information from the meeting notice. In such embodiments, the virtual ticket generator 1118 may be configured to receive the registration request (and visit information) via the meeting notice from the server.

The visitor management system 1102 may be configured to receive the registration request via the communications interface 1120. Specifically, the virtual ticket generator 1118 may be configured to receive the registration request. The employee client device 1114 (or server hosting or otherwise executing the calendar or schedule data corresponding to the employee) may be configured to transmit the registration request (or data corresponding thereto) to the visitor management system 1102. The virtual ticket generator 1118 may be configured to receive the registration request via the communications interface 1120.

In some embodiments, the virtual ticket generator 1118 may be configured to populate a registration form. The registration form may be a form which is at least partially fillable by a visitor of the building 10. The registration form may solicit information corresponding to the visitor. In some implementations, the virtual ticket generator 1118 may be configured to populate the registration form with known information from the registration request. For instance, the virtual ticket generator 1118 may be configured to populate the registration request with the visitor's name, email address or phone number, visit date, time, and duration, etc. Such information may be extracted from the registration request, from the server which hosts the calendar or schedule for the employee, etc. In some implementations, the virtual ticket generator 1118 may include a dedicated agent for retrieving information corresponding to the visit, and a dedicated agent for populating the registration forms. The agent for retrieving information may coordinate with an agent corresponding to the server hosting data corresponding to a calendar or schedule (e.g., across a dedicated channel which communicably couples the agents). Each agent may together form a network to intelligently identify and populate at least some information in the fillable registration form without the visitor's intervention or input (e.g., based on the information in the registration request, based on the data corresponding to the employee's calendar/schedule).

The virtual ticket generator 1118 may be configured to transmit a link to a registration form to the visitor client device 1116 for the visitor. The link may be a hyperlink to a webpage corresponding to the registration form, a link for downloading a document or other formatted file corresponding to the registration form, etc. The virtual ticket generator 1118 may be configured to communicate the link to the visitor client device 1116 for the visitor based on information from the registration request. For instance, the registration request may include contact information, such as an email address, phone number, etc., associated with the visitor. The virtual ticket generator 1118 may be configured to identify the contact information from the registration request supplied or otherwise included in the registration request. The virtual ticket generator 1118 may be configured to communicate the link (e.g., via the communications interface 1120) to the visitor client device 1118 using the contact information.

The visitor client device 1116 may be configured to receive the link from the virtual ticket generator 1118. The visitor may select the link to launch the registration form. The registration form may solicit visitor information corresponding to the visitor. The visitor information may pertain to the visitor (e.g., as opposed to the visit information which corresponds to the visit). As some non-limiting examples, the registration form may solicit information corresponding to the visitor's license plate number, the client device(s) which the user plans on bringing or using during the visit (which may be the same as the visitor client device 1116 or different), a photograph of the visitor's face, etc. The visitor may provide inputs to the registration form via the visitor client device 1116 (which were not previously populated by the virtual ticket generator 1118). The visitor may select an option to submit the registration form following completion on the visitor client device 1116.

The virtual ticket generator 1118 may be configured to receive visitor information based on inputs to the registration form (e.g., provided by the visitor to the registration form via the visitor client device 1116). Upon selection of the option to submit, the virtual ticket generator 1118 may be configured to identify, detect, or otherwise receive the inputs corresponding to the visitor information. In some embodiments, the visitor client device 1116 may transmit the completed registration form to the virtual ticket generator 1118 (e.g., upon selection of the option to submit). In some embodiments, the visitor client device 1116 may be configured to ping (e.g., through transmission of a notification or other message) the virtual ticket generator 1118 to indicate completion of the registration form (e.g., upon selection of the option to submit). In some embodiments, the virtual ticket generator 1118 may be configured to monitor the registration form. In such embodiments, the virtual ticket generator 1118 may be configured to identify the selection of the option to submit. In each of these embodiments, the virtual ticket generator 1118 may be configured to receive the visitor information provided by the visitor on their visitor client device 1116 based on the inputs to the registration form.

The virtual ticket generator 1116 may be configured to generate a virtual ticket. A virtual ticket may be a data packet or structure having a unique code or identifier which may be used to identify an individual or person. The virtual ticket may be configured for passing between two or more endpoints or terminals. Each virtual ticket may be uniquely associated with a visitor. In some embodiments, the virtual ticket may be used for identifying a visitor to determine various locations or spaces which the visitor may access. The virtual ticket generator 1116 may be configured to generate the virtual ticket using the visit information from the registration request and the visitor information from the registration form. The virtual ticket generator 1116 may be configured to generate the virtual ticket to be uniquely associated with the visitor indicated in the registration request. The virtual ticket generator 1116 may be configured to provide the virtual ticket to the client device which the visitor is planning on bringing to the visit (e.g., as indicated in the visit information). In some examples and instances, the client device which the visitor is planning on bringing to the visit may be the same as the visitor client device 1116. In some examples and instances, the client device which the visitor is planning on bringing to the visit may be different from the visitor client device 1116.

In some embodiments, the virtual ticket generator 1116 may be configured to store a copy of the virtual ticket in a visitor database 1122. The visitor database 1122 may be a database configured or structured to store data corresponding to visitors of the building 10. While shown as embodied within the memory 1108, in some implementations, the visitor database 1122 may be separate from the memory 1108 and within the visitor management system 1102, within the building management system 102, or separate from but otherwise accessible by the building management system 102 and/or visitor management system 1102. The visitor database 1122 may store entries corresponding to each registered visitor. The virtual ticket generator 1116 may be configured to generate entries for the visitor database 1122 as registration requests are received and/or when visitor information is received. The entries may include, for instance, the virtual ticket (or data corresponding to the virtual ticket), the building 10 premises which are accessible by the visitor, times/dates in which those spaces are accessible, etc. The entries may also include information corresponding to the visitor as contained in the visitor information, such as information corresponding to the visitor's license plate, features identified within the photograph of the visitor's face, a unique identifier associated with the client device which the visitor is planning to bring on the visit, etc.

The virtual ticket generator 1116 may be configured to identify the spaces of the building 10 premises where the visitor is permitted to access based on the information contained in the registration request. As stated above, the registration request may include data which indicates the location or scope of the visit. For instance, where the visitor is attending a meeting at the building 10, the registration request may indicate the meeting room location. The virtual ticket generator 1116 may be configured to identify the spaces of the building 10 premises based on the scope of the visit. The spaces of the building 10 premises may include each location within the scope of the visit (for instance, the meeting location along with the locations along the route between the entrance and meeting location, common areas or public areas, etc.). Hence, each visitor may have a different scope of visit and, therefore, be permitted access to different locations.

The virtual ticket generator 1116 may be configured to identify a duration in which the visitor is permitted access to the identified spaces based on the information contained in the request. The registration request may indicate the meeting is on a certain date, starting at a certain time, and lasting a certain duration. The virtual ticket generator 1116 may be configured to extract, from the registration request, a range of time in which the visitor is permitted to access the spaces in the building 10. The range of time may be the same as the start time of the meeting and duration, or the range of time may be different. In some implementations, the range of time may begin earlier than the start time of the meeting and end after the end time of the meeting. Hence, the range of time may be greater than the expected duration of the meeting. Such embodiments provide for commute time by the visitor.

The virtual ticket generator 1116 may provide the virtual ticket to the visitor client device 1116. The virtual ticket generator 1116 may be configured to provide the virtual ticket to the visitor client device 1116 using the communications interface 1120. The visitor client device 1116 may be configured to receive and automatically store the virtual ticket to the digital wallet for the visitor client device 1116. The visitor may use the visitor client device 1116 for accessing the permitted spaces of the building 10 premises, as described in greater detail below.

The memory 1108 may include a visitor identifier 1124. The visitor identifier 1124 may be an application or agent designed or implemented to identify visitors entering the premises of the building 10. As used herein, "premises" includes the building 10 (including the entrance of the building 10 and various spaces, rooms, access points, etc. within the building 10), the parking structure or parking lot for the building 10, entrances to the parking structure or parking lot, and so forth. Hence, premises refers generally to spaces in, around, and within the building 10. The visitor identifier 1124 may be configured to receive identification data from, for instance, surveillance components 1110. The visitor identifier 1124 may be configured to receive the data via the network which connects the building subsystems 120 including the security subsystem 130 having the surveillance component(s) 1110. The visitor identifier 1124 may be configured to use the data received from the surveillance components 1110 to determine identification data corresponding to the visitor(s) seeking access to the building 10 premises. The visitor identifier 1124 may be configured to validate the identity of the visitor(s) based on the identification data prior to permitting (or denying) the visitor(s) access to the building 10 premises.

In some embodiments, the visitor identifier 1124 includes a device identification system (or device identification agent). The device identification system may be or include any terminal configured to receive or otherwise detect a virtual ticket from a client device. The device identification system may include a near-field communications (NFC) system, and the client device may include an NFC system. The client device and device identification system may pass the virtual ticket using the respective NFC system. Additionally or alternatively, the device identification system may use Bluetooth, WiFi, and/or cellular connections (e.g., via a 4G or 5G access point/small cell base station, etc.). The device identification system may receive the data extracted by the surveillance components 1110 (e.g., the virtual ticket which is uniquely associated with the visitor). In some embodiments, the device identification system (and/or an agent corresponding to the device identification system) may be configured to receive data from the surveillance components 1110 (or an agent corresponding thereto) via a dedicated channel for facilitating communication between the device identification system and surveillance components 1110. The data received by the device identification system may be uniquely associated with a person (e.g., the visitor) seeking access to the building 10 premises.

In some embodiments, the visitor identifier 1124 includes a facial recognition system (or facial recognition agent). In such embodiments, the identification data may be data corresponding to features of the visitor(s) face. The facial recognition system may receive the data (e.g., images) from the surveillance components (e.g., images of the visitor's face). In some embodiments, the facial recognition system (and/or an agent corresponding to the facial recognition system) may be configured to receive data from the surveillance components 1110 (or an agent corresponding thereto) via a dedicated channel for facilitating communication between the facial recognition system and surveillance components 1110. The facial recognition system may be configured to analyze faces contained in images captured via the surveillance components 1110 (where the surveillance components 1110 are camera(s)). The facial recognition system may be configured to identify, extract, locate, etc. features within the faces contained in the images. Such features within the faces contained in the images may correspond to the identity of the visitor(s) seeking access to the building 10 premises.

In some embodiments, the visitor identifier 1124 includes a license plate recognition system (or license plate recognition agent). In such embodiments, the identification data may be data corresponding to a license plate of the visitor's vehicle. The license plate recognition system may receive the data (e.g., images) from the surveillance components 1110 (e.g., images of the front or rear of the vehicle where the license plate is typically located). In some embodiments, the license plate recognition system (and/or an agent corresponding to the license plate recognition system) may be configured to receive data from the surveillance components 1110 (or an agent corresponding thereto) via a dedicated channel for facilitating communication between the license plate recognition system and surveillance components 1110. The license plate recognition system may be configured to extract the license plate number from the images received from the surveillance components 1110 (e.g., using character recognition techniques). The license plate number may be indicative of the identity of the visitor(s) seeking access to the building 10 premises.

While these examples are provided, the present disclosure is not limited to these particular examples of identifying visitors entering (or attempting to enter) the building 10 premises. To the contrary, the visitor identifier 1124 may identify visitors entering the building 10 premises in any number of ways based on data from the surveillance components 1110. Various combinations surveillance components 1110 and data, along with recognition system(s), may be incorporated into the system 1100 for determining the identity of (e.g., characteristics, features, or data which is indicative of the identity of) visitors entering the building 10.

In some embodiments, the visitor identifier 1124 may be configured to validate the identity of the visitor seeking access to the building 10 premises. The visitor identifier 1124 may be configured to access data from the visitor database 1122. The visitor identifier 1124 may be configured to validate the identity of the visitor based on the identification data received or otherwise determined based on the data from the surveillance components 1110. In some embodiments, the visitor identifier 1124 may be configured to access the visitor database 1122 to retrieve the entry corresponding to the identification data.

In embodiments where the visitor identifier 1124 determines the identification data via the device identification system based on the virtual ticket, the visitor identifier 1124 may cross-reference the virtual ticket with the entries contained in the visitor database 1122. In embodiments where the visitor identifier 1124 determines the identification data via the facial recognition system based on the image from the camera of the visitor's face, the visitor identifier 1124 may cross-reference the features extracted from the facial recognition system with the entries contained in the visitor database 1122. In embodiments where the visitor identifier 1124 determines the identification data via the license plate recognition system based on the image from the camera of the visitor's vehicle including the vehicle's license plate, the visitor identifier 1124 may cross-reference the features extracted from the license plate recognition system with the entries contained in the visitor database 1122.

The visitor identifier 1124 may be configured to validate the identity of the visitor(s) seeking access to the building 10 premises. In some embodiments, the visitor identifier 1124 may be configured to validate the identity of the visitor(s) by cross-referencing the identification data (e.g., the data corresponding to the virtual ticket, data corresponding to the features of the visitor(s) face from the facial recognition system, the data corresponding to the license plate of the vehicle from the license plate recognition system 1114, etc.) with the entries in the visitor database 1122. The visitor identifier 1124 may be configured to sort, look-up, or otherwise compare the identification data in the entries in the visitor database 1122 with the identification data determined by the visitor identifier 1124 based on the data from the surveillance component(s) 1110. The visitor identifier 1124 may be configured to determine whether the identification data determined by the visitor identifier 1124 sufficiently matches an entry within the visitor database 1122 (e.g., exact match, within a threshold such as 95% match, 90% match, 80% match, and so forth). Where the visitor identifier 1124 identifies a sufficient match, the visitor identifier 1124 may validate the identity of the visitor(s) seeking access to the building premises. The visitor identifier 1124 may be configured to extract, identify, or otherwise retrieve the corresponding entry in the visitor database 1122. The data within the entry may be used for determining whether the visitor is permitted access to the space in which the visitor seeks to access, among other uses.

As described above, the security subsystem 130 is shown to include electronic access points 1112. The electronic access points 1112 may be or include any device(s) or components configured to receive signals for selectively permitting or denying access to one or more locations in or within the building 10. In some embodiments, the electronic access points 1112 may be electronically controlled locks, motorized gates or doors, etc. The electronic access points 1112 may be arranged or positioned at or on various entry points for the building 10 including, for instance, at the entrance of the building 10, on various doors within the building 10, and so forth. The electronic access points 1112 may be configured to selectively lock and unlock various portions of the building 10 premises responsive to receiving corresponding signals (e.g., from the building management system 102, as described in greater detail below).

The memory 1108 may store an access point controller 1126. The access point controller 1126 may be an application or agent designed or implemented for generating signals for controlling the electronic access points 1112. The access point controller 1126 may be configured to determine whether a visitor is permitted to access various locations and spaces of the building 10 premises. The access point controller 1126 may be configured to selectively control the electronic access points 1112 based on whether or not the visitor is permitted to access the spaces corresponding to the respective electronic access points 1112, as described in greater detail below.

The access point controller 1126 may be configured to receive an access request. The visitor may request to access various spaces within the building 10 premises by, for instance, approaching a door which controls access to the space in view of the corresponding surveillance component 1110, swiping or positioning the visitor client device 1116 in close proximity to a surveillance component 1110 near the door, etc. The access point controller 1126 may be configured to receive or otherwise detect the request from the corresponding surveillance component 1110. The access point controller 1126 may be configured to use the data from the entry retrieved for the visitor by the visitor identifier 1124 from the visitor database 1122. As described above, the entries within the visitor database 1122 may include data corresponding to permitted access spaces. Permitted access spaces may be or include locations of the building 10 premises in which the visitor is permitted to access (and locations along the route or path to the permitted locations of the building 10). For instance, some spaces may be dedicated for authorized personnel only.

The access point controller 1126 may be configured to determine, based on the data from the entry corresponding to the identified visitor, whether the visitor is permitted to access the space of the building 10 premises (which is controlled by a respective electronic access point 1112 and monitored by a respective surveillance component 1110) in which the visitor seeks to access. The access point controller 1126 may be configured to determine whether the visitor is permitted to access the space of the building 10 premises based on data within the entry corresponding to the visitor in the visitor database 1122. As stated above, each entry may include data corresponding to which spaces the visitor is permitted to access and a range of time in which the visitor is permitted to access those spaces. The access point controller 1126 may be configured to determine whether the visitor is permitted to access the space of the building 10 premises based on the time in which the access request from the visitor is received. The access point controller 1126 may be configured to determine the time in which the access point controller 1126 received the access request from the surveillance component 1110 located at (e.g., in proximity to) the electronic access point 1112. The access point controller 1126 may be configured to compare the time to the range of time in which the visitor is to be permitted access to the corresponding space (e.g., as indicated in the entry within the visitor database 1122 corresponding to the visitor).

The access point controller 1126 may be configured to generate a signal for the electronic access point 1112 responsive to determining that the visitor is permitted to access the corresponding space of the building 10 premises. The signal generated by the access point controller 1126 may be structured to cause the electronic access point 1112 to lock or unlock an access point for the building 10 premises. The access point controller 1126 may be configured to transmit the signal to the electronic access point 1112. In some implementations, an agent for or corresponding to the access point controller 1126 may be configured to transmit the signal to an agent for the electronic access point 1112 (e.g., across a dedicated channel). The electronic access point 1112 (or agent for or corresponding to the electronic access point 1112) may be configured to receive the signal from the electronic access point 1112. Responsive to receipt, the electronic access point 1112 may automatically lock or unlock the access point in accordance with the signal from the access point controller 1126. As such, the access point controller 1126 may be configured to seamlessly control access to various locations, spaces, areas, etc. on, in, or within the building 10 premises.

Such embodiments may provide seamless access to various spaces within the building 10 to visitors. Furthermore, such embodiments may automatically limit access based on information contained in the registration request from the employee (e.g., locations and times of the visit, for instance). The visitors may feel more welcome at the building by easily accessing various locations without the need of security or employee escorts.

Figure 5:
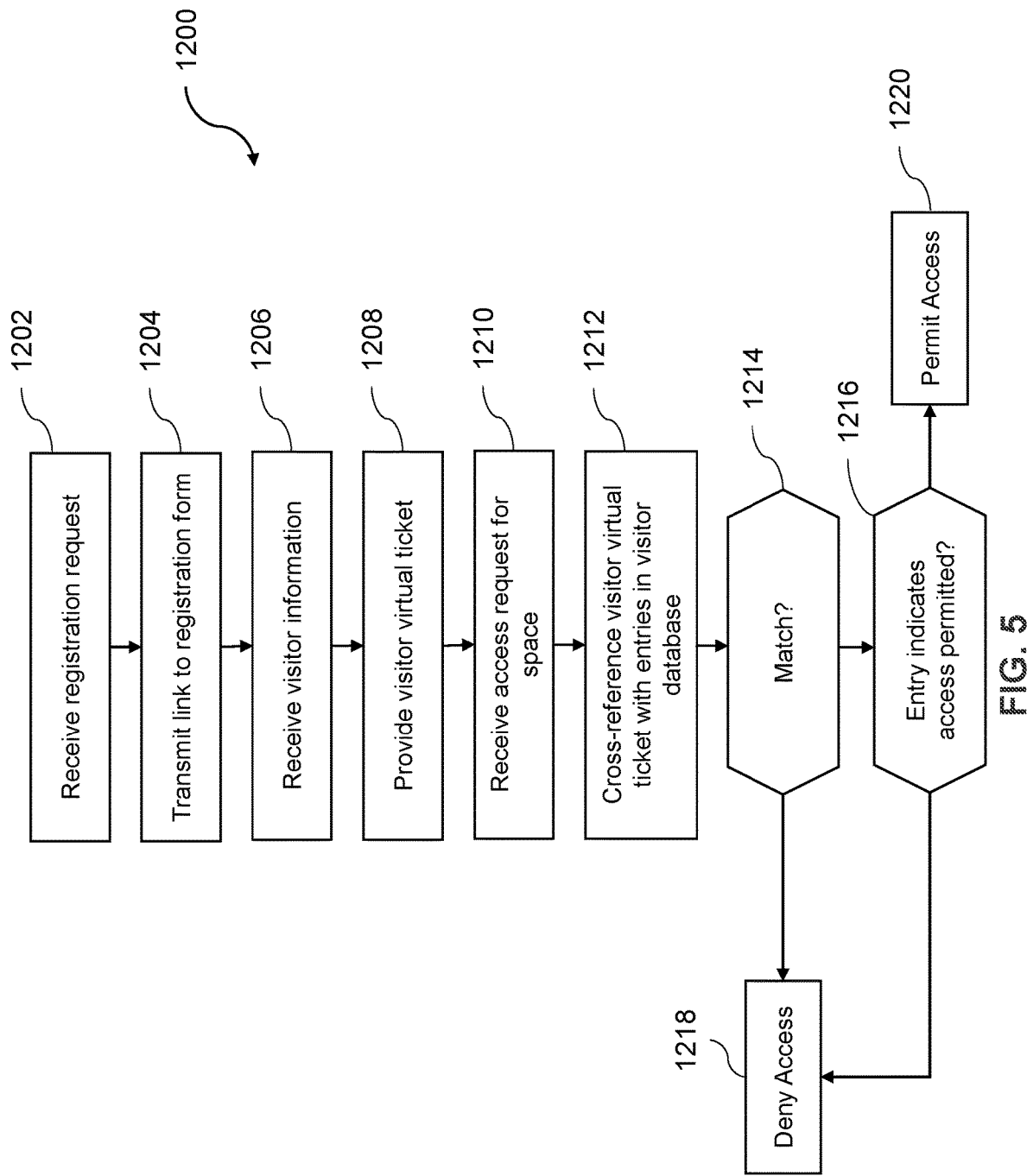
FIG. 5 is a flowchart showing a method for visitor management, according to an exemplary embodiment.

Now that various aspects of the system 1100 have been described, an example method for visitor management is described. Specifically, FIG. 5 depicts a flowchart showing a method 1200 for visitor management, according to an exemplary embodiment. The steps and operations of the method 1200 described with reference to FIG. 5 may be performed by or via the agents, devices, components, and/or elements described above. However, the method 1200 is not specifically limited to these devices, components, and elements.

At step 1202, the visitor management system 1102 receives a registration request. In some embodiments, the visitor management system 1102 may receive, via a communications interface, the registration request. The communications interface 1120 may be configured to provide for data exchange with one or more client devices. The registration request being associated with a visitor to visit a building 10 at a scheduled time. An employee may generate the registration request on an employee client device 1112 in response to scheduling a meeting with the visitor. In some embodiments, an agent corresponding to a server hosting calendar or schedule data may generate the registration request based on a new meeting notice. The employee client device 1112 and/or agent may provide the registration request to the visitor management system 1102.

The visitor management system 1102 may extract visit information from the registration request. The visit information may include, for instance, contact information corresponding to the visitor, a date of the visit, a time and duration of the visit, a location of the visit (e.g., which spaces the visitor will be accessing, such as which conference or meeting rooms). The visitor management system 1102 may compile, construct, build, or otherwise generate a registration form for the visitor. The registration form may be a form which requests or otherwise solicits visitor information corresponding to the visitor (such as visitor license plate number, device information corresponding to the client device which the visitor plans on carrying during the visit, etc.). In some embodiments, the visitor management system 1102 may populate the registration form with information contained in the registration request.

At step 1204, the visitor management system 1102 transmits a link to a registration form. In some embodiments, the visitor management system 1102 may transmit, via the communications 1120 interface to a visitor client device 1116 associated with the visitor, a link to a registration form. The link may be a hyperlink or URL corresponding to a webpage including the registration form, a link for downloading a page, document, or other file format including the registration form, etc. The visitor management system 1102 may transmit the link to the visitor client device 1116 in accordance with the visit information from the registration request (e.g., an email address or phone number for the visitor included in the registration request).

The visitor client device 1116 may receive the link from the visitor management system 1102. The visitor may select the link to launch the registration form. The registration form may be a fillable form which solicits visitor information from the visitor, as described above. The visitor may provide the remaining visitor information (e.g., following population of information by the visitor management system 1102) to the registration form. The visitor may select an option to submit the registration form to the visitor management system 1102.

At step 1206, the visitor management system 1102 receives visitor information. The visitor management system 1102 may receive the visitor information based on the inputs to the registration form. The visitor management system 1102 may extract the responses to the registration form. The visitor management system 1102 may compile the responses to the registration form. The compiled responses together may form the visitor information. The visitor information may correspond to the visitor's identification—e.g., license plate number, facial features, device information corresponding to the client device 1116 which the visitor is planning on bringing to the visit).

The visitor management system 1102 may generate, based on the visit information from the registration request and/or the visitor information, a visitor virtual ticket. The visitor virtual ticket may be a data packet or structure having a unique code or identifier which may be used to identify an individual or person. The visitor virtual ticket may be configured to be stored in a digital wallet of the visitor client device 1116. The visitor virtual ticket may be passed between two or more endpoints or terminals. Each visitor virtual ticket may be uniquely associated with a visitor. In some embodiments, the visitor virtual ticket may be used by the visitor management system 1102 for identifying a visitor to determine various locations or spaces which the visitor may attempt to access. The visitor virtual ticket may be passed to, provided to, or otherwise validated by surveillance components 1110 within the building as the visitor carrying the client device 1116 positions the client device 1116 near the surveillance components 1110. The visitor virtual ticket may be used to provide seamless access to the visitor of the building 10 premises (during their visit).

At step 1208, the visitor management system 1102 provides a visitor virtual ticket. The visitor management system 1102 may provide the visitor virtual ticket to the visitor client device 1116 for accessing one or more space(s) of the building 10 premises during the scheduled time of the visit. In some embodiments, the visitor management system 1102 provides the visitor virtual ticket at or near the time of the visit (e.g., the day of the meeting, the day before the meeting, etc.). The visitor client device 1116 may receive the visitor virtual ticket from the visitor management system 1102. The visitor client device 1116 may store (e.g., automatically or in response to a request from the visitor) the visitor virtual ticket in the digital wallet for the visitor client device 1116.

At step 1210, the visitor management system 1102 receives an access request for a space. In some embodiments, the visitor management system 1102 may receive, at one of a plurality of electronic access points 1112, an access request for accessing the space corresponding to the electronic access point 1112. The building 10 may include a plurality of electronic access points 1112 for control access to a respective space of the building 10 premises. The electronic access points 1112 may be motorized gates or doors, electronically controlled locks, etc. The electronic access points 1112 may be used for limiting access to corresponding spaces. The electronic access points 1112 may control access to, for instance, a parking area for the building 10, an entrance of the building 10, and/or a room within the building 10.

The visitor management system 1102 may receive the request from a surveillance component 1110 which corresponds to the electronic access point 1112. The visitor may generate, trigger, etc. the access request by, for instance, positioning the visitor client device 1116 in proximity to the surveillance component 1110. The visitor client device 1116 may pass the visitor virtual ticket to the surveillance component 1110. The surveillance component 1110 may provide the received visitor virtual ticket to the visitor management system 1102.

At step 1212, the visitor management system 1102 cross-references the visitor virtual ticket with entries in the visitor database 1122. Generally speaking, the visitor management system 1102 may determine, based on the registration request (e.g., received at step 1202), whether the visitor is to be permitted access to the space. The visitor database 1122 may store entries corresponding to visitors who are registered with the visitor management system. Each entry may include, for instance, the visitor's corresponding visitor virtual ticket (or data corresponding thereto), data corresponding to spaces in which the visitor is permitted to access, and data corresponding to times (e.g., a range of time) in which the visitor is permitted to access those spaces, among other data. The visitor management system 1102 may look-up, search, filter, or otherwise compare the visitor virtual ticket included in the access request (e.g., received at step 1210) with the entries in the visitor database 1122.

At step 1214, the visitor management system 1102 determines whether there is a match between the visitor virtual ticket and an entry. Specifically, the visitor management system 1102 may determine whether there is a match between the visitor virtual ticket included in the access request from the visitor client device 1116 and a virtual ticket included in an entry from the visitor database 1122. Where the visitor management system 1102 determines there is a match, the method 1200 may proceed to step 1216. Where the visitor management system 1102 determines there is not a match, the method 1200 may proceed to step 1218.

At step 1216, the visitor management system 1102 determines whether the entry indicates access is permitted. In some embodiments, the visitor management system 1102 determines whether the visitor is to be permitted access to the space. The visitor management system 1102 may determine whether the visitor is to be permitted access to the space based on the entry in the visitor database.

The visitor management system 1102 may identify, in the visitor database, the entry corresponding to the visitor. The visitor management system 1102 may identify the data corresponding to the spaces in which the visitor is permitted to access, and the times in which the visitor is permitted to access those spaces. The visitor management system 1102 may extract, identify, or otherwise determine, based on such data, whether the space corresponding to the electronic access point 1112 is included in the spaces the visitor is permitted to access. The visitor management system 1102 may maintain a database (which may be the same as or separate from the visitor database 1122) which stores data corresponding to each electronic access point 1112 and corresponding spaces. The database may act as a digital twin corresponding to the building, where the location and spaces are reflected in the database. The visitor management system 1102 may determine, based on the access request, identification information corresponding to the electronic access point 1112. The visitor management system 1102 may cross-reference the identification information in the database to determine the corresponding space. The visitor management system 1102 may then determine whether the visitor is to be permitted access to the space based on the data from the entry in the visitor database 1122 and entry in the database including the identification information for the electronic access points 1112.

In some embodiments, the visitor management system 1102 may determine a time in which the access request is received (e.g., at step 1210). The visitor management system 1102 may determine the time based on a timestamp of the access request, or timestamp of the data received from the surveillance component 1110. The visitor management system 1102 may determine what time the visitor is permitted to access the space. As stated above, the entries in the visitor database 1122 may include data corresponding to the range of time in which the visitor is permitted to access the space. The visitor management system 1102 may determine whether the visitor is permitted to access the space based on a comparison of the time in which the access request is received and the range of time from the entry corresponding to the visitor. Hence, in some embodiments, while a visitor may otherwise be permitted to access a space, the visitor may not be permitted to access the space due to the access request being received at certain times, after certain times, etc.

At step 1218, the visitor management system 1102 denies access to the space. The visitor management system 1102 may deny access to the space where, for instance, the visitor virtual ticket is invalid, the visitor is not permitted to access the space at all, the visitor is not permitted to access the space at the time in which the access request is received, etc. In some embodiments, when the visitor management system 1102 denies access to the space, the visitor management system 1102 may automatically generate a notification to alert one or more parties (e.g., security, the visitor, the host, etc.) that the visitor was denied access to the space.

At step 1220, the visitor management system 1102 permits access to the space. The visitor management system 1102 may generate and transmit a signal to the electronic access point 1112 to permit the visitor to access the space. The electronic access point 1112 may receive the signal from the visitor management system 1102. The electronic access point 1112 may automatically provide the visitor access to the corresponding space (e.g., by automatically unlocking or opening the door, lifting or opening the gate, etc.).

In some embodiments, responsive to permitting access to the space, the visitor management system 1102 may automatically generate a notification which is transmitted to the employee client device 1114. The notification may alert the corresponding employee of the visitor's arrival to, for instance, the parking area, the entrance of the building 10, etc. The employee may then greet the visitor and escort the visitor through the building 10.

Figure 6:
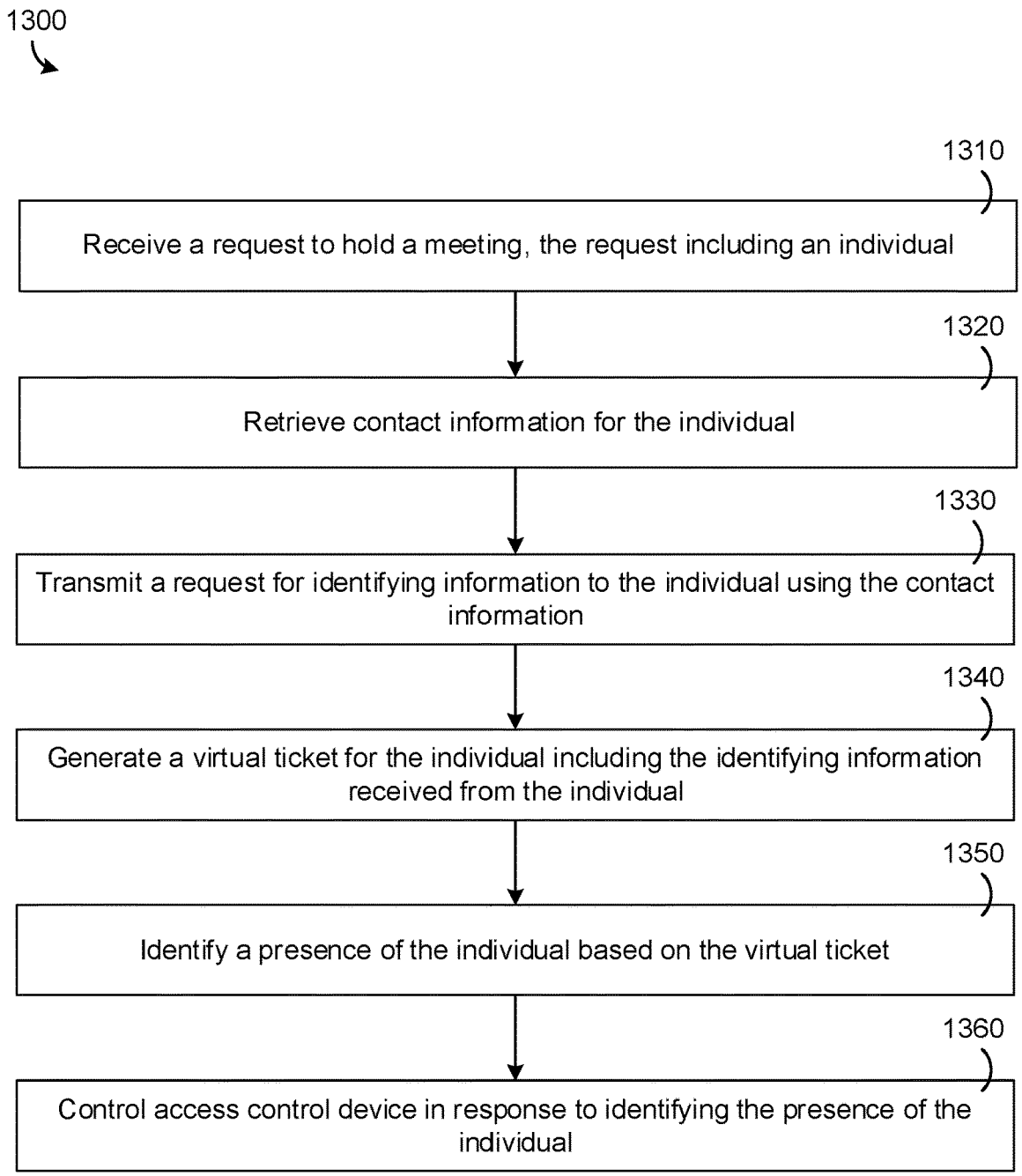
FIG. 6 is a flowchart showing a method for frictionless access, according to an embodiment.

Referring now specifically to FIG. 6, a method of frictionless access 1300 facilitated by visitor management system 1102 is shown, according to an embodiment. Speaking generally, visitor management system 1102 may be configured to control access control devices based on a virtual ticket and an identified presence of an individual corresponding to the virtual ticket. At step 1310, visitor management system 1102 receives a request to hold a meeting, the request including an individual. In various embodiments, visitor management system 1102 is coupled with external systems to receive meeting requests. For example, visitor management system 1102 may be coupled to an email service (e.g., an email client, an email server, etc.) and receive meeting requests therefrom. In some embodiments, an employee may send a calendar invite to a visitor and visitor management system 1102 may also receive the calendar invite. At step 1320, visitor management system 1102 retrieves contact information for the individual. For example, visitor management system 1102 may retrieve an email address associated with the individual from a calendar invite. In various embodiments, visitor management system 1102 is configured to determine which individuals included in the meeting request are associated with an organization (e.g., those within the organization, those outside of the organization, etc.). For example, a meeting request may include a first individual who is an employee of a company hosting the meeting, a second individual who is a visitor, and a third individual who is a visitor. To continue the example, visitor management system 1102 may be configured to determine that the second and third individuals are visitors and the first individual is not a visitor (e.g., by analyzing the contact information associated with each individual, by comparing the contact information to an employee database, etc.). While method 1300 is described in reference to a single individual, it should be understood that the method may apply to multiple individuals (e.g., creating multiple virtual tickets for multiple visitors included in a single meeting request, etc.). In some embodiments, visitor management system 1102 may retrieve contact information for the individual from various sources. For example, visitor management system 1102 may reference entity graph 170 to retrieve contact information for the individual.

At step 1330, visitor management system 1102 transmits a request for identifying information to the individual using the contact information. For example, visitor management system 1102 may send an email to the individual using an email address retrieved in step 1320. In various embodiments, the request for identifying information may include a registration form. For example, the request may include the registration form described above in reference to FIG. 5. In some embodiments, the request is associated with visitor client device 1116. For example, the request may include triggering an action within a mobile application of client device 1116. In various embodiments, visitor management system 1102 receives a response to the request for identifying information transmitted in step 1330. For example, the individual may send an email response including identifying information to visitor management system 1102. In various embodiments, visitor management system 1102 determines a purpose of the individual. For example, visitor management system 1102 may query entity graph 170 (e.g., using the identifying information, etc.) to determine a reason the individual is visiting building 10. In some embodiments, a purpose of the individual includes attending a meeting, performing services (e.g., repairs, maintenance, etc.) in building 10, making a delivery, visiting, and/or the like.

At step 1340, visitor management system 1102 generates a virtual ticket for the individual including the identifying information received from the individual. In various embodiments, the virtual ticket is the virtual ticket described in detail above with reference to FIG. 5. In some embodiments, visitor management system 1102 associates the virtual ticket with an entity graph. For example, visitor management system 1102 may store the virtual ticket in entity graph 170. In some embodiments, visitor management system 1102 sends the virtual ticket to the individual (e.g., to visitor client device 1116, etc.).

At step 1350, visitor management system 1102 identifies a presence of the individual based on the virtual ticket. For example, a visitor may arrive at building 10 and surveillance component(s) 1110 may send an image of the individual to visitor management system 1102 which may identify the individual using facial recognition and an image provided by the individual (e.g., in response to step 1330, etc.). Additionally or alternatively, visitor management system 1102 may identify the individual using an identifier of the individual (e.g., via NFC with visitor client device 1116, etc.).

At step 1360, visitor management system 1102 controls access control devices in response to identifying the presence of the individual. For example, visitor management system 1102 may unlock a door to grant the individual access to building 10. To continue the example, visitor management system 1102 may unlock a door leading to a conference room in which the meeting of the individual is located. In various embodiments, the virtual ticket includes security information and visitor management system 1102 may selectively grant the individual access to the building 10 based on the security information. For example, the individual may be denied access to a portion of the building 10 not associated with the meeting and may be granted access to a portion of the building 10 associated with the meeting. In various embodiments, visitor management system 1102 is configured to detect a presence of the individual near an access control point and selectively control the access control point in response to the presence of the individual. For example, visitor management system 1102 may detect a presence of the individual in front of a door, determine whether the individual is permitted to have access to opening the door, and open the door in response to determining that the individual is permitted. Additionally or alternatively, visitor management system 1102 may control one or more digital signs based on the presence of the individual. For example, visitor management system 1102 may display directions to the individual describing a route to a location of the meeting on digital signage located throughout the building 10. In various embodiments, visitor management system 1102 controls access control devices based on a determined purpose of the individual. For example, a first individual having a purpose of attending a meeting may be granted access to building 10, while a second individual having an undetermined purpose may not be granted access to building 10. As a further example, a first individual who visits building 10 frequently may be granted access to building 10 even though they don't have an explicitly scheduled meeting while a second individual who very infrequently visits building 10 may not be granted access to building 10 when they don't have an explicitly scheduled meeting. In various embodiments, the purpose of the individual is based on context information associated with the individual. For example, context information associated with a first individual may reveal that it is not out of the ordinary for the first individual to make frequent unscheduled visits to building 10 and may therefore determine the purpose of the first individual during a particular visit is: "an informal visit." However, visitor management system 1102 may determine, based on context information, that it is out of the ordinary for a second individual to visit building 10 and may therefore flag the purpose of the individual for further inquiry (e.g., by a receptionist, etc.).

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

The term "client or "server" include all kinds of apparatus, devices, and machines for processing data, including by way of example a programmable processor, a computer, a system on a chip, or multiple ones, or combinations, of the foregoing. The apparatus may include special purpose logic circuitry, e.g., a field programmable gate array (FPGA) or an application specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive), etc.). Devices suitable for storing computer program instructions and data include all forms of non-volatile memory, media and memory devices, including by way of example semiconductor memory devices (e.g., EPROM, EEPROM, and flash memory devices; magnetic disks, e.g., internal hard disks or removable disks; magneto-optical disks; and CD ROM and DVD-ROM disks). The processor and the memory may be supplemented by, or incorporated in, special purpose logic circuitry. The term processing circuit as used herein may include hardware, software, or any combination thereof. For example, a processing circuit may include a processor and memory having instructions stored thereon that, when executed by the processor, cause the processing circuit to perform the operations described herein.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user and a keyboard, a pointing device, e.g., a mouse, trackball, etc., or a touch screen, touch pad, etc.) by which the user may provide input to the computer. Other kinds of devices may be used to provide for interaction with a user as well; for example, feedback provided to the user may be any form of sensory feedback (e.g., visual feedback, auditory feedback, or tactile feedback), and input from the user may be received in any form, including acoustic, speech, or tactile input. In addition, a computer may interact with a user by sending documents to and receiving documents from a device that is used by the user; for example, by sending web pages to a web browser on a user's client device in response to requests received from the web browser.

Implementations of the subject matter described in this disclosure may be implemented in a computing system that includes a back-end component (e.g., as a data server), or that includes a middleware component (e.g., an application server), or that includes a front end component (e.g., a client computer) having a graphical user interface or a web browser through which a user may interact with an implementation of the subject matter described in this disclosure, or any combination of one or more such back end, middleware, or front end components. The components of the system may be interconnected by any form or medium of digital data communication (e.g., a communication network). Examples of communication networks include a LAN and a WAN, an inter-network (e.g., the Internet), and peer-to-peer networks (e.g., ad hoc peer-to-peer networks).

The present disclosure may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, features or aspects within each example embodiment should typically be considered as available for other similar features or aspects in other example embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

What is claimed is:

1. One or more non-transitory computer-readable storage media having instructions stored thereon that, when executed by one or more processors, cause the one or more processors to:
   receive a request to hold a meeting in a building, the request including an indication of a visiting individual;
   retrieve, from the request, contact information for the visiting individual;
   transmit a request for identifying information to a user device of the visiting individual using the contact information, the request prompting the visiting individual to provide a plurality of pieces of identifying information including biometric data of the visiting individual;
   receive a response from the user device of the visiting individual responsive to transmitting the request, the response including the plurality of pieces of identifying information including the biometric data;
   determine a purpose of the visiting individual based on the identifying information;
   generate a virtual ticket for the visiting individual based on the purpose of the visiting individual;
   identify a presence of the visiting individual at the building based on the biometric data and image data; and
   control access control devices in response to identifying the presence of the visiting individual to grant the visiting individual access to the building.

2. The one or more non-transitory computer-readable storage media of claim 1, wherein the identifying information received from the visiting individual includes an image of the visiting individual.

3. The one or more non-transitory computer-readable storage media of claim 2, wherein identifying the presence of the visiting individual includes recognizing a face of the visiting individual based on the image of the visiting individual.

4. The one or more non-transitory computer-readable storage media of claim 1, wherein the identifying information received from the visiting individual includes an alphanumeric identifier associated with the visiting individual.

5. The one or more non-transitory computer-readable storage media of claim 4, wherein identifying the presence of the visiting individual includes recognizing a license plate of a vehicle associated with the visiting individual based on the alphanumeric identifier.

6. The one or more non-transitory computer-readable storage media of claim 1, wherein the purpose of the visiting individual includes attending the meeting, wherein the request includes a conference room, and wherein the virtual ticket includes a location of the conference room, and wherein controlling the access control devices to grant the visiting individual access to the building includes granting the visiting individual access to the conference room and a physical route to the location of the conference room.

7. The one or more non-transitory computer-readable storage media of claim 6, wherein controlling the access control devices to grant the visiting individual access to the building further includes controlling one or more access control devices associated with doors of the building.

8. The one or more non-transitory computer-readable storage media of claim 1, wherein the contact information includes at least one of an email address or a phone number of the visiting individual.

9. The one or more non-transitory computer-readable storage media of claim 1, wherein the one or more processors control the access control devices based on access rights associated with the visiting individual.

10. A method of visitor management, comprising:
   receiving a request to hold a meeting in a building, the request including an indication of a visiting individual;
   retrieving, from the request, contact information for the visiting individual;
   transmitting a request for identifying information to a user device of the visiting individual using the contact information, the request prompting the visiting individual to provide a plurality of pieces of identifying information including biometric data of the visiting individual;
   receiving a response from the user device of the visiting individual responsive to transmitting the request, the response including the plurality of pieces of identifying information including the biometric data;
   determining a purpose of the visiting individual based on the identifying information;
   generating a virtual ticket for the visiting individual based on the purpose of the visiting individual;
   identifying a presence of the visiting individual at the building based on the biometric data and image data; and
   controlling access control devices in response to identifying the presence of the visiting individual to grant the visiting individual access to the building.

11. The method of claim 10, wherein the identifying information received from the visiting individual includes an image of the visiting individual.

12. The method of claim 11, wherein identifying the presence of the visiting individual includes recognizing a face of the visiting individual based on the image of the visiting individual.

13. The method of claim 10, wherein the identifying information received from the visiting individual includes an alphanumeric identifier associated with the visiting individual.

14. The method of claim 13, wherein identifying the presence of the visiting individual includes recognizing a license plate of a vehicle associated with the visiting individual based on the alphanumeric identifier.

15. The method of claim 10, wherein the purpose of the visiting individual includes attending the meeting, wherein the request includes a conference room, and wherein the virtual ticket includes a location of the conference room, and wherein controlling the access control devices to grant the visiting individual access to the building includes granting the visiting individual access to the conference room and a physical route to the location of the conference room.

16. The method of claim 15, wherein controlling the access control devices to grant the visiting individual access to the building further includes controlling one or more access control devices associated with doors of the building.

17. The method of claim 10, wherein the contact information includes at least one of an email address or a phone number of the visiting individual.

18. The method of claim 10, wherein the method includes controlling the access control devices based on access rights associated with the visiting individual.

19. A building management system (BMS), comprising:
   one or more processing circuits and one or more computer readable storage media, the one or more computer readable storage media having instructions stored thereon that, when executed by the one or more processing circuits, cause the one or more processing circuits to:

receive a request to hold a meeting in a building, the request including an indication of a visiting individual;

retrieve, from the request, contact information for the visiting individual;

transmit a request for identifying information to a user device of the visiting individual using the contact information, the request prompting the visiting individual to provide a plurality of pieces of identifying information including biometric data of the visiting individual;

receive a response from the user device of the visiting individual responsive to transmitting the request, the response including the plurality of pieces of identifying information including the biometric data;

determine a purpose of the visiting individual based on the identifying information;

generate a virtual ticket for the visiting individual based on the purpose of the visiting individual, wherein the virtual ticket includes an image of the visiting individual;

identify a presence of the visiting individual at the building based on the biometric data and image data, wherein identifying the presence of the visiting individual includes recognizing a face of the visiting individual based on the image of the visiting individual; and control access control devices based on access rights associated with the visiting individual to grant the visiting individual access to the building.

20. The building management system (BMS) of claim 19, wherein the purpose of the visiting individual includes attending the meeting, wherein the request includes a conference room, and wherein the virtual ticket includes a location of the conference room, and wherein controlling the access control devices to grant the visiting individual access to the building includes granting the visiting individual access to the conference room and a physical route to the location of the conference room.

* * * * *